United States Patent
Mogi

(10) Patent No.: US 12,454,672 B2
(45) Date of Patent: Oct. 28, 2025

(54) COMPONENT RECOVERY MECHANISM, COMPONENT RECOVERY CONTAINER, COMPONENT RECOVERY KIT, COMPONENT RECOVERY SYSTEM, CULTURE CONTAINER, CULTURE SYSTEM, AND METHOD OF PRODUCING CELLS

(71) Applicant: YOKOGAWA ELECTRIC CORPORATION, Tokyo (JP)

(72) Inventor: Takeyuki Mogi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 950 days.

(21) Appl. No.: 17/596,992

(22) PCT Filed: Apr. 30, 2020

(86) PCT No.: PCT/JP2020/018317
§ 371 (c)(1),
(2) Date: Dec. 22, 2021

(87) PCT Pub. No.: WO2021/014710
PCT Pub. Date: Jan. 28, 2021

(65) Prior Publication Data
US 2022/0267711 A1 Aug. 25, 2022

(30) Foreign Application Priority Data
Jul. 22, 2019 (JP) .................. 2019-134880

(51) Int. Cl.
*C12M 1/00* (2006.01)
*C12M 1/36* (2006.01)

(52) U.S. Cl.
CPC ............ *C12M 47/02* (2013.01); *C12M 29/04* (2013.01); *C12M 41/48* (2013.01)

(58) Field of Classification Search
CPC ...... C12M 47/02; C12M 29/04; C12M 41/48; C12M 47/10; C12M 33/14
See application file for complete search history.

(56) References Cited

FOREIGN PATENT DOCUMENTS

| JP | 2-71813 A | 3/1990 | |
|---|---|---|---|
| JP | H0271813 A * | 3/1990 | |
| JP | 4-344637 A | 12/1992 | |
| JP | 2009-273399 A | 11/2009 | |
| WO | WO-2008059274 A1 * | 5/2008 | ......... G01N 21/6428 |
| WO | 2011/111562 A1 | 9/2011 | |

(Continued)

OTHER PUBLICATIONS

"Immunoprecipitation Protocol Using Dynabeads Protein A or Dynabeads Protein G", Thermo Fisher Scientific Inc., Novex, Internet website, Retrieved Jun. 7, 2019, Total 2 pages.

*Primary Examiner* — John McGuirk
(74) *Attorney, Agent, or Firm* — RANKIN, HILL & CLARK LLP

(57) ABSTRACT

A component recovery mechanism includes a recovery unit configured to recover a component for recovery from a target, and a diffusion adjustment unit configured to adjust a diffusion rate of the component for recovery from the target to the recovery unit. The diffusion adjustment unit changes the diffusion rate of the component for recovery from the target to the recovery unit according to a change in at least one environmental parameter.

13 Claims, 23 Drawing Sheets

(56) References Cited

FOREIGN PATENT DOCUMENTS

| WO | 2014/109379 A1 | 7/2014 |
| WO | 2014/161036 A1 | 10/2014 |
| WO | 2019/146531 A1 | 8/2019 |

* cited by examiner

COMPONENT RECOVERY MECHANISM, COMPONENT RECOVERY CONTAINER, COMPONENT RECOVERY KIT, COMPONENT RECOVERY SYSTEM, CULTURE CONTAINER, CULTURE SYSTEM, AND METHOD OF PRODUCING CELLS

CROSS-REFERENCE TO RELATED APPLICATION

The present application claims priority to Japanese Patent Application No. 2019-134880 filed on Jul. 22, 2019, the entire contents of which are incorporated herein by reference.

TECHNICAL FIELD

The present disclosure relates to a component recovery mechanism, a component recovery container, a component recovery kit, a component recovery system, a culture container, a culture system, and a method of producing cells.

BACKGROUND

A method for recovering a component for recovery from a target, such as a culture, has been required for purposes such as biochemical analysis. As a method of recovering a component for recovery in a target, a method of recovering a specific protein (component for recovery) using magnetic beads modified by antibodies is known (Non-patent Literature 1). In this method, the sample solution (target) is mixed with magnetic beads, the specific protein is bound to the antibodies of the magnetic beads, and the magnetic beads with the component for recovery bound thereto are then recovered using magnetism.

CITATION LIST

Non-Patent Literature

NPL 1: "Immunoprecipitation Protocol Using Dynabeads Protein A or Dynabeads® Protein G", Thermo Fisher Scientific Inc., Internet website [retrieved Jun. 7, 2019]

SUMMARY

Technical Problem

However, in the method described in NPL 1, the magnetic beads have to be added to and removed from the target to recover the component for recovery, and the risk of contamination is high.

Therefore, the present disclosure aims to provide technology, for recovering a component for recovery, that has a low risk of contamination by use of a diffusion phenomenon.

Solution to Problem

A component recovery mechanism according to an embodiment includes a recovery unit configured to recover a component for recovery from a target, and a diffusion adjustment unit configured to adjust a diffusion rate of the component for recovery from the target to the recovery unit. The diffusion adjustment unit changes the diffusion rate of the component for recovery from the target to the recovery unit according to a change in at least one environmental parameter. The provision of a diffusion adjustment unit and use of a diffusion phenomenon to recover the component for recovery in this way can reduce the risk of contamination when the component for recovery is recovered.

In the component recovery mechanism according to an embodiment, the recovery unit may include a re-diffusion suppression mechanism configured to suppress re-diffusion of the component for recovery from the recovery unit to the target. By the re-diffusion suppression mechanism that suppresses re-diffusion of the component for recovery from the recovery unit to the target being included in this way in the recovery unit, re-diffusion of the component for recovery to the target can be prevented, and the component for recovery can be recovered more efficiently. Furthermore, by the recovery unit including the re-diffusion suppression mechanism that suppresses re-diffusion of the component for recovery from the recovery unit to the target in this way, the component for recovery can be recovered at a higher concentration.

In the component recovery mechanism according to an embodiment, the recovery unit may include an affinity unit with affinity for the component for recovery. By the recovery unit including an affinity unit with affinity for the component for recovery in this way, the affinity unit can prevent re-diffusion of the component for recovery to the target, and a specific component for recovery can be recovered more efficiently.

In the component recovery mechanism according to an embodiment, the recovery unit may include a porous material, and the affinity unit may include an affinity substance or functional group bound to the porous material via a carrier, and an outer diameter of the carrier may be greater than a maximum pore diameter of the porous material in a swollen state. By an affinity substance or functional group being bound to the porous material via a carrier in this way, various types of components for recovery can be recovered.

In the component recovery mechanism according to an embodiment, a water absorption rate of the recovery unit may be 10% or more and 500% or less. By the water absorption rate of the recovery unit being 10% or more and 500% or less in this way, the component for recovery can more suitably be recovered in the recovery unit.

In the component recovery mechanism according to an embodiment, the diffusion adjustment unit may include a stimulus responsive material and may change the diffusion rate of the component for recovery from the target to the recovery unit according to at least one stimulus. By a stimulus-responsive material being used to change the diffusion rate of the component for recovery in this way, the recovery of the component for recovery can be controlled with a simple configuration, without the use of a complicated apparatus configuration.

In the component recovery mechanism according to an embodiment, the diffusion adjustment unit may further include a near-infrared absorber that absorbs near-infrared rays, the stimulus-responsive material may be a temperature-responsive material, and the temperature-responsive material may change the diffusion rate of the component for recovery from the target to the recovery unit according to a temperature change of the near-infrared absorber. Such use of a near-infrared absorber that absorbs near-infrared rays and a temperature-responsive material that changes the diffusion rate of the component for recovery according to a temperature change of the near-infrared absorber enables adjustment of the diffusion rate of the component for recovery by use of heating of the near-infrared absorber through irradiation of near-infrared rays. The recovery of the component for recovery can therefore be controlled while reducing the effect on the target and the component for recovery.

A component recovery container according to an embodiment may include the component recovery mechanism of the present disclosure and a target introduction unit configured to introduce the target. The target introduction unit and the component recovery mechanism may be connected via the diffusion adjustment unit. According to such a component recovery container, the diffusion phenomenon of the component for recovery via the diffusion adjustment unit can be used to adjust the recovery of the component for recovery efficiently and easily.

In an embodiment, the component recovery container may include a plurality of the target introduction units. By a plurality of target introduction units being included in the component recovery container in this way, the component for recovery can be recovered from the plurality of target introduction units in parallel, and the component for recovery can be recovered efficiently.

In an embodiment, the component recovery container may include a plurality of the component recovery mechanisms. By the component recovery container including a plurality of the component recovery mechanisms in this way, recovery of the component for recovery by the plurality of component recovery mechanisms can be controlled independently. The amount and timing of recovery of the component for recovery can thereby be adjusted more freely.

In an embodiment, the plurality of component recovery mechanisms in the component recovery container may recover differ types of components for recovery from each other. By the plurality of component recovery mechanisms recovering different types of components for recovery from each other in this way, a plurality of types of components for recovery can be recovered.

The component recovery container according to an embodiment may further include, in addition to the component recovery mechanism, an additive diffusion mechanism that includes an additive retention unit configured to retain an additive to be added to the target, and an additive diffusion adjustment unit configured to adjust a diffusion rate of the additive from inside the additive retention unit to outside the additive retention unit, and the target introduction unit and the additive diffusion mechanism may be connected via the additive diffusion adjustment unit. By the component recovery container thus further including the additive diffusion mechanism in addition to the component recovery mechanism, and the target introduction unit and the additive diffusion mechanism being connected via the additive diffusion adjustment unit, the addition of the additive to the target and the recovery of the component for recovery from the target can both be efficiently and easily controlled.

A component recovery kit according to an embodiment may include a component recovery mechanism. According to such a component recovery kit that includes a component recovery mechanism, the component for recovery can easily be recovered from the target.

A component recovery kit according to an embodiment may include a component recovery mechanism and an instruction manual. According to such a component recovery kit that includes a component recovery mechanism, the component for recovery can easily be recovered from the target.

A component recovery system according to an embodiment may include the component recovery container of the present disclosure and a recovery management apparatus. The recovery management apparatus may include an acquisition interface, a controller, and a transmitter. The acquisition interface may be configured to acquire a recovery protocol that defines at least a recovery procedure of the component for recovery. The controller may be configured to refer to the recovery protocol to generate transmitter control information. The transmitter may be configured to transmit a control signal, to the diffusion adjustment unit, for adjusting the diffusion rate of the component for recovery into the recovery unit based on the transmitter control information. The diffusion adjustment unit may be configured to adjust the diffusion rate of the component for recovery from the target to the recovery unit based on the control signal. According to such a component recovery system, the recovery of the component for recovery from the target can be controlled efficiently and easily.

The component recovery system according to an embodiment may further include an additive diffusion mechanism that includes an additive retention unit configured to retain an additive to be added to the target, and an additive diffusion adjustment unit configured to adjust a diffusion rate of the additive from inside the additive retention unit to outside the additive retention unit. The acquisition interface may be further configured to acquire an addition protocol that defines an addition procedure of the additive. The controller may be further configured to refer to the addition protocol to generate transmitter control information. The transmitter may be configured to transmit an additive control signal for adjusting the diffusion rate of the additive to the additive diffusion adjustment unit based on the transmitter control information, and the additive diffusion adjustment unit may be configured to adjust the diffusion rate of the additive based on the additive control signal. According to such a component recovery system, the addition of the additive to the target and the recovery of the component for recovery from the target can both be controlled efficiently and easily.

In the component recovery system according to an embodiment, the recovery protocol may be configured to define at least one piece of information selected from among the group consisting of a recovery amount of the component for recovery, a recovery duration, and a timing. By the recovery protocol thus defining at least one piece of information selected from among the group consisting of a recovery amount of the component for recovery, a recovery duration, and a timing, the component recovery system can acquire the recovery protocol and adjust at least one selected from among the group consisting of the recovery amount of the component for recovery, the recovery duration, and the timing.

In the component recovery system according to an embodiment, a signal transmission path for transmitting the control signal to the diffusion adjustment unit may be connected to the transmitter. When a signal transmission path for transmitting the control signal to the diffusion adjustment unit is connected to the transmitter in this way, the control signal can be transmitted accurately to the diffusion adjustment unit.

In an embodiment, the component recovery system may further include a plurality of the component recovery containers and a transport unit configured to move at least one component recovery container among the plurality of component recovery containers to a predetermined position. The controller may be configured to refer to the recovery protocol to generate, for each component recovery container among the plurality of component recovery containers, transmitter control information for recovering the component for recovery. Based on the transmitter control information corresponding to the component recovery container located at the position, the transmitter may be configured to transmit the control signal to the diffusion adjustment unit of the component recovery container moved to the position. By the transmitter control information being generated for each component recovery container and the control signal being transmitted to each component recovery container transported to a predetermined position in this way, a plurality of component recovery containers can be used for automatic, efficient recovery.

In an embodiment, the component recovery system may further include a target supply unit configured to supply the target to the target introduction unit. The target supply unit may include a target storage unit, a target preservation unit, a target transfer unit, and a target transfer route. The recovery protocol may define a procedure to supply the target, the controller may refer to the recovery protocol to generate target supply unit control information, and the target supply unit may supply the target to the target introduction unit based on the target supply unit control information. By the target supply unit supplying the target to the target introduction unit based on the target supply unit control information in this way, the supply of the target can also be automated, thus enabling more efficient recovery of the component for recovery.

In an embodiment, the component recovery system may further include a target supply unit configured to supply the target to the target introduction unit. The target supply unit may include a target storage unit, a target preservation unit, a target transfer unit, and a target transfer route. At least a portion of the component recovery container may be a semi-permeable membrane unit formed by a semi-permeable membrane. A fluid connection may be formed between the component recovery container and the target transfer route via the semi-permeable membrane unit. Components of the target supplied from the target supply unit and the target inside the component recovery container may be exchanged via the semi-permeable membrane unit. By components of the target supplied from the target supply unit and the target in the component recovery container being exchanged via the semi-permeable membrane unit in this way, the risk of contamination can be further reduced.

In an embodiment, the component recovery system may further include a target state measurement unit configured to measure a state of the target in the target introduction unit. The controller may be configured to refer additionally to a measurement result of the state of the target by the target state measurement unit to generate the transmitter control information. By the transmitter control information being generated with reference to the measurement result of the state of the target in this way, the component for recovery can be recovered suitably according to the state of the target.

In an embodiment, the component recovery system may further include a component for recovery measurement unit configured to measure a concentration of the component for recovery included in the target inside the target introduction unit, and the control unit may further refer to a measurement result of the concentration of the component for recovery by the component for recovery measurement unit to generate the transmitter control information. By the transmitter control information thus being generated with reference to the measurement result of the concentration of the component for recovery, the recovery can be performed while the concentration of the component for recovery is monitored. A proper amount of the component for recovery can thereby be recovered.

In an embodiment, the component recovery system may include an environment maintenance unit for maintaining a physical parameter inside the target introduction unit within a certain range. By a physical parameter inside the target introduction unit being maintained within a certain range by the environment maintenance unit in this way, recovery can be performed efficiently even when the target is sensitive to changes in the physical parameter.

In an embodiment, a component recovery system may include a recovery management apparatus and a component recovery container that includes a plurality of target introduction units into which a target is introduced and a plurality of component recovery mechanisms provided for the plurality of target introduction units. Each component recovery mechanism may include a diffusion adjustment unit and a recovery unit. The recovery management apparatus may include an acquisition interface, a controller, and a transmitter. The acquisition interface may be configured to acquire a recovery protocol that defines at least a recovery procedure of the component for recovery, the controller may be configured to refer to the recovery protocol to generate transmitter control information, the transmitter may be configured to transmit a control signal for adjusting a diffusion rate of the component for recovery to the plurality of diffusion adjustment units based on the transmitter control information, and each diffusion adjustment unit may be configured to adjust the diffusion rate of the component for recovery to the plurality of target introduction units based on the control signal. According to such a component recovery system, the recovery of the component for recovery from a plurality of targets can be controlled efficiently and easily.

In an embodiment, a component recovery system may include a recovery management apparatus and a component recovery container that includes a plurality of component recovery mechanisms and a target introduction unit into which a target is introduced. Each component recovery mechanism may include a diffusion adjustment unit and a component for recovery retention unit. The recovery management apparatus may include an acquisition interface, a controller, and a transmitter. A plurality of signal transmission paths for transmitting a control signal to the plurality of diffusion adjustment units may be connected to the transmitter. The acquisition interface may be configured to acquire a recovery protocol that defines at least a recovery procedure of the component for recovery, the controller may be configured to refer to the recovery protocol to generate transmitter control information, the transmitter may be configured to transmit a control signal for adjusting a diffusion rate of the component for recovery to the plurality of diffusion adjustment units over the plurality of signal transmission paths based on the transmitter control information, and each diffusion adjustment unit may be configured to adjust the diffusion rate of the component for recovery from the plurality of target introduction units based on the control signal. This component recovery system can transmit the control signal without crosstalk even when the plurality of diffusion adjustment units are located near each other. Recovery of the component for recovery can therefore be controlled more accurately.

A culture container according to an embodiment may include the component recovery mechanism of the present disclosure and a target introduction unit configured to introduce the target. The target introduction unit and the component recovery mechanism may be connected via the diffusion adjustment unit. The target may be a culture medium, and the target introduction unit may be a culture unit for culturing a culture target in the culture medium. Such a culture container enables culturing of a culture target, such as cells, while efficiently and easily adjusting the recovery of the component for recovery from the culture medium using the phenomenon of diffusion of the component for recovery via the diffusion adjustment unit.

A culture system according to an embodiment may include a culture container and a recovery management apparatus. The recovery management apparatus may include an acquisition interface, a controller, and a transmitter. The acquisition interface may be configured to acquire a recovery protocol that defines at least a recovery procedure of the component for recovery. The controller may be configured to refer to the recovery protocol to generate transmitter control information. The transmitter may be configured to transmit a control signal, to the diffusion adjustment unit, for adjusting the diffusion rate of the component for recovery from the culture medium to the recovery unit based on the transmitter control information. The diffusion adjustment unit may be configured to adjust the diffusion rate of the component for recovery from the culture medium to the recovery unit based on the control signal. Such a culture system enables culturing of a culture target, such as cells, while efficiently and easily adjusting the recovery of the component for recovery from the culture medium using the phenomenon of diffusion of the component for recovery via the diffusion adjustment unit.

The culture system according to an embodiment may further include an additive diffusion mechanism that includes an additive retention unit configured to retain an additive used in a culture, and an additive diffusion adjustment unit configured to adjust a diffusion rate of the additive from inside the additive retention unit to outside the additive retention unit. The acquisition interface may be further configured to acquire an addition protocol that defines an addition procedure of the additive. The controller may be further configured to refer to the addition protocol to generate transmitter control information. The transmitter may be configured to transmit an additive control signal for adjusting the diffusion rate of the additive to the additive diffusion adjustment unit based on the transmitter control information, and the additive diffusion adjustment unit may be configured to adjust the diffusion rate of the additive based on the additive control signal. According to such a culture system, the culture target, such as cells, can be cultured while the addition of the additive to the target and the recovery of the component for recovery from the target are both controlled efficiently and easily.

A method of producing cells according to an embodiment may be a method of producing cells that uses the culture system of the present disclosure. Such a method of producing cells enables cell production while efficiently and easily adjusting the recovery of the component for recovery from the culture medium.

In an embodiment, a method of producing cells may be a method of producing cells using a culture system that includes a culture container according to the present disclosure and a recovery management apparatus that includes an acquisition interface, a controller, and a transmitter, the method including acquiring, by the acquisition interface, a recovery protocol that defines at least a recovery procedure of the component for recovery, generating, by the controller, transmitter control information with reference to the recovery protocol, transmitting, by the transmitter, a control signal to the diffusion adjustment unit for adjusting the diffusion rate of the component for recovery based on the transmitter control information, and adjusting, by the diffusion adjustment unit, the diffusion rate of the component for recovery based on the control signal. Such a method of producing cells enables cell production while efficiently and easily adjusting the recovery of the component for recovery from the culture medium.

Advantageous Effect

According to the present disclosure, technology for recovering a component for recovery with a low risk of contamination by use of a diffusion phenomenon can be provided.

BRIEF DESCRIPTION OF THE DRAWINGS

In the accompanying drawings:

FIG. 1A illustrates the perimeter of a recovery unit being surrounded by an impermeable unit and a diffusion adjustment unit, FIG. 1B illustrates the entire perimeter of the recovery unit being surrounded by the diffusion adjustment unit, and FIG. 1C illustrates a stimulus-responsive material being caused to function as both the recovery unit and the diffusion adjustment unit;

FIG. 10A is an embodiment in which the plurality of target introduction units are arranged to surround a component recovery mechanism, and FIG. 10B is an embodiment in which the plurality of target introduction units are arranged on one surface of a component recovery mechanism;

DETAILED DESCRIPTION

Figure 1A:
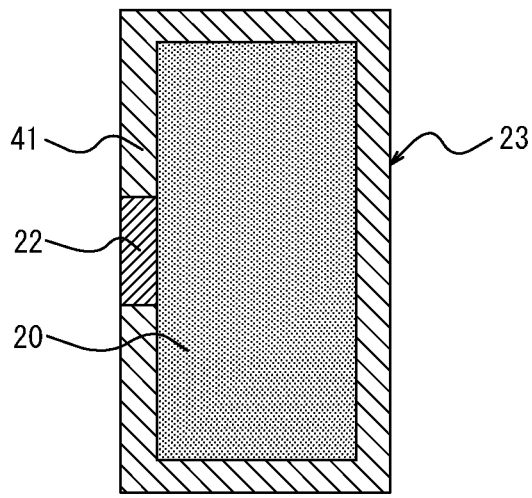
FIGS. 1A to 1C are cross-sectional views illustrating an example of a component recovery mechanism, where

Embodiments of the present disclosure are described below based on the drawings. Identical reference signs in the drawings indicate identical or similar constituent elements.

[Component Recovery Mechanism]

A component recovery mechanism of the present disclosure includes a recovery unit that recovers a component for recovery from a target, and a diffusion adjustment unit that adjusts a diffusion rate of the component for recovery from the target to the recovery unit. The diffusion adjustment unit changes the diffusion rate of the component for recovery from the target to the recovery unit according to a change in at least one environmental parameter. By the diffusion adjustment unit that adjusts the diffusion rate of the component for recovery from the target to the recovery unit thus being provided, the amount and timing when recovering the component for recovery from the target can be properly adjusted by appropriately adjusting the environmental parameter. Therefore, by equipping the component recovery mechanism with, for example, the component recovery container described below, the recovery of the component for recovery from the target can be controlled as desired.

In the known technology described above, it is necessary to place magnetic beads or the like into the target at the timing for starting to recover the component for recovery, and it is necessary to retrieve the magnetic beads or the like from the target at the timing for finishing recovery of the component for recovery. Such addition and removal of magnetic beads or the like from the target entails a risk of contamination. Furthermore, when experimental operations are performed manually, there are restrictions on the timing at which the component for recovery can be recovered. By contrast, the component recovery mechanism of the present disclosure recovers the component for recovery by using a diffusion phenomenon. Therefore, unlike known technology, the component recovery mechanism need not be placed into or removed from the target at the timing of the start and end of recovery, and the component for recovery can be recovered while a sealed state is maintained. The component for recovery can consequently be recovered with a lower risk of contamination than with known technology. Also, according to the component recovery mechanism of the present disclosure, the component for recovery can be recovered at a predetermined timing by adjusting the diffusion rate. Furthermore, since the component for recovery can be recovered by adjusting the diffusion rate, the recovery can be performed with a simpler operation than when manually performing a method using magnetic beads or the like.

The component recovery mechanism can, for example, be used to exclude unnecessary components as the component for recovery from the target, such as a culture medium or the like, and to recover useful components as the component for recovery from the target. The component recovery mechanism can also be used to recover the component for recovery as a sample for ascertaining the condition of the target, such as a culture medium.

Figure 1B:
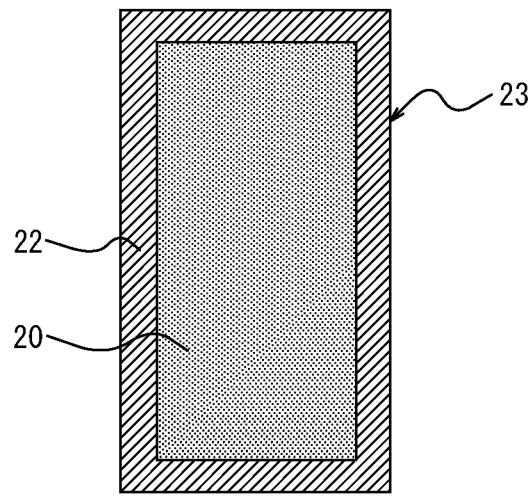

An example of a specific form of the component recovery mechanism is described with reference to FIGS. 1A and 1B, which schematically illustrate cross-sections of an example of a component recovery mechanism 23. The entire periphery of a recovery unit 20 may be surrounded by a diffusion adjustment unit 22, as illustrated in FIG. 1B, or the periphery may be surrounded by an impermeable unit 41, which blocks diffusion or passage of a component for recovery, and the diffusion adjustment unit 22, as illustrated in FIG. 1A.

[Diffusion Adjustment Unit]

Figure 2:
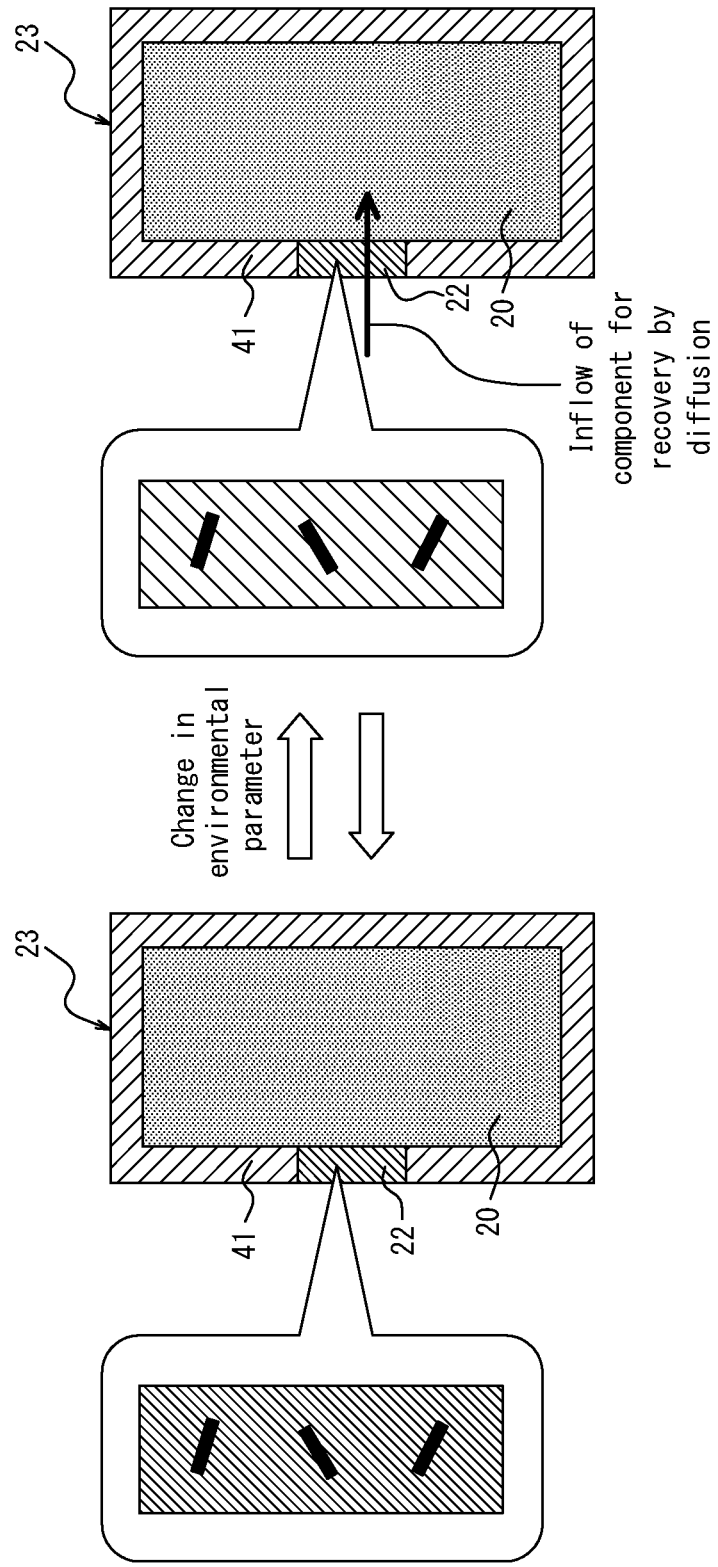
FIG. 2 is an overview illustrating example operations of the diffusion adjustment unit according to a change in an environmental parameter.

FIG. 2 illustrates example operations of the diffusion adjustment unit 22. As illustrated in FIG. 2, the diffusion adjustment unit 22 adjusts the diffusion rate of the component for recovery from outside the recovery unit 20 to inside the recovery unit 20 according to a change in at least one environmental parameter. As a result, the component for recovery is diffused into the recovery unit 20, described below. It suffices to adjust the diffusion rate by a switch between two states, i.e., a state in which diffusion of the component for recovery to outside the recovery unit 20 is encouraged, and a state in which diffusion of the component for recovery to outside the recovery unit 20 is suppressed (including the case of substantially zero diffusion). The diffusion adjustment unit 22 may, for example, control the diffusion rate with a method that uses a physical barrier, such as an electromagnetic valve, or control the diffusion rate with a method that uses a state change of a chemical substance, such as a stimulus-responsive material. This configuration enables changing of the diffusion rate of the component for recovery by changing an environmental parameter, such as changing the permeability of the component for recovery with respect to the diffusion adjustment unit 22, or by opening and closing of a valve, such as an electromagnetic valve. The recovery of the component for recovery can be controlled with a simple configuration, without the use of a complicated apparatus configuration.

The diffusion adjustment unit 22 is preferably a membrane structure or a valve that includes an environment-responsive material in at least a portion thereof. Examples of the environment-responsive material include a stimulus-responsive material, a shape-memory polymer, a shape-memory alloy, and an elastic body. When an environmental parameter is changed, these environment-responsive materials change structurally, the permeability of the component for recovery with respect to the membrane structure changes, or a member forming a valve changes by deformation such as expansion/contraction or bending to open or close the valve. Consequently, the diffusion rate of the component for recovery changes.

The environment-responsive material may respond to any environmental parameter. Examples of the environmental parameter include: temperature, light, pH, magnetic fields, electric fields, sound waves, redox, molecular concentration, and the like when the environment-responsive material is a stimulus-responsive material; light and temperature when the environment-responsive material is a shape-memory polymer; temperature when the environment-responsive material is a shape-memory alloy; and pressure when the environment-responsive material is an elastic body.

Among the above-described environment-responsive materials, the diffusion adjustment unit 22 particularly preferably includes a stimulus-responsive material. When the diffusion adjustment unit 22 includes a stimulus-responsive material, the stimulus provided to the diffusion adjustment unit 22 can be controlled to change the diffusion rate of the component for recovery, for example by changing the permeability of the component for recovery with respect to the diffusion adjustment unit 22 or changing the affinity between the inner surface of the recovery unit 20 and the component for recovery. The recovery of the component for recovery can therefore be controlled with a simple configuration, without the use of a complicated apparatus configuration.

The diffusion adjustment unit 22 is preferably a membrane structure or a valve that includes a stimulus-responsive material in at least a portion thereof. The stimulus-responsive material may be of any type, and the above-described materials that respond to particular stimuli may be used as appropriate. When these stimulus-responsive materials receive a stimulus and change structurally, the permeability of the component for recovery with respect to the membrane structure changes, or a member forming a valve changes by deformation such as expansion/contraction or bending to open or close the valve. The diffusion rate of the component for recovery can thus be adjusted via the diffusion adjustment unit 22.

In an example, the stimulus-responsive material may be a stimulus-responsive material that changes from an aggregated state to a swollen state in response to a stimulus. A temperature-responsive material, a pH-responsive material, a molecule-responsive material, a light-responsive material, a redox-responsive material, a sound wave-responsive material, and the like can be used as such a stimulus-responsive material.

Among the above-described types of stimuli, local heating of the stimulus-responsive material and thermal diffusion enable a temperature rise around the target to be suppressed within a range that substantially has no adverse effect. Hence, a temperature-responsive material is preferably used as the stimulus-responsive material. A lower critical solution temperature (LCST)-type polymer and an upper critical solution temperature (UCST)-type polymer, for example, can be used as the temperature-responsive material. In an aqueous solution, an LCST-type polymer is hydrophilic at a temperature equal to or less than the LCST (coiled; swollen state) and undergoes phase transition to become hydrophobic (globular; aggregated state) at a temperature greater than the LCST. In an aqueous solution, a UCST-type polymer is hydrophobic at a temperature less than the UCST (globular; aggregated state) and undergoes phase transition to become hydrophilic (coiled; swollen state) at a temperature equal to or greater than the UCST. Polyamide-based LCST-type polymers, polyether-based LCST-type polymers, phosphoester-based LCST-type polymers, polymers incorporating proteins, and the like can be used as the above-described LCST-type polymer.

In greater detail, poly(N-isopropylacrylamide), poloxamers, poly(N-vinylcaprolactam), poly methyl vinyl ether, methyl cellulose, and elastin-containing polymers reported by Conrad et al. (Conrad et al., 2009) can be used; and as UCST-type polymers, poly(allylamine-co-allylurea), poly (acrylamide-co-acrylonitrile), hydroxypropyl cellulose, poloxamers such as poloxamer 407, methacrylamide polymers, polymethacrylate having a sulfobetaine group, and the like can be used. These polymers can be used alone, or a plurality thereof can be used in combination. The LCST-type polymer or UCST-type polymer may also be a block copolymer formed using two or more monomers selected from the group consisting of isopropyl acrylamide, caprolactam, allyl amine, allyl urea, sulfobetaine, ethylene glycol, methacrylate, styrene, norbornene, phosphazene, methyl vinyl ether, acrylonitrile, and lactide. The phase transition temperature of these block copolymers can be adjusted by the type and quantity ratio of the monomers that are used. An LCST-type polymer and a UCST-type polymer can be combined and used as a stimulus-responsive material. The phase transition temperature of these temperature-responsive materials can be appropriately adjusted by the amount and the like of a functional group that is introduced. For example, an alkyl group, amide group, piperazine group, pyrrolidine group, acetal group, ketal group, oxazoline group, oxyethylene group, sulfonate group, alcohol group, sulfobetaine group, uracil group, ureido group, glycine amide group, and the like can be used as the functional groups that are introduced. For good control over diffusion of the component for recovery, the phase transition temperature of the temperature-responsive material is preferably within a different temperature range than the temperature of the target. The phase transition temperature of the temperature-responsive material is also preferably a temperature that does not adversely affect the target and the component for recovery. In an example, the phase transition temperature of the temperature-responsive material is preferably in a range of 20° C. or more and 60° C. or less. When the target is a culture medium that includes animal cells, such as human cells, the phase transition temperature is preferably 38° C. or more and 50° C. or less to ensure a different temperature range than the culturing temperature of around 37° C.

Figure 3X:
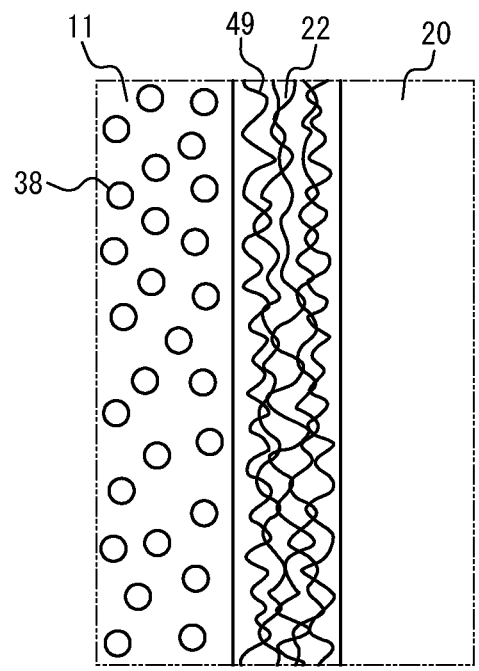
FIG. 3 is a diagram illustrating the change in the diffusion rate of a component for recovery via a membrane structure that includes a temperature-responsive material.
Figure 3Y:
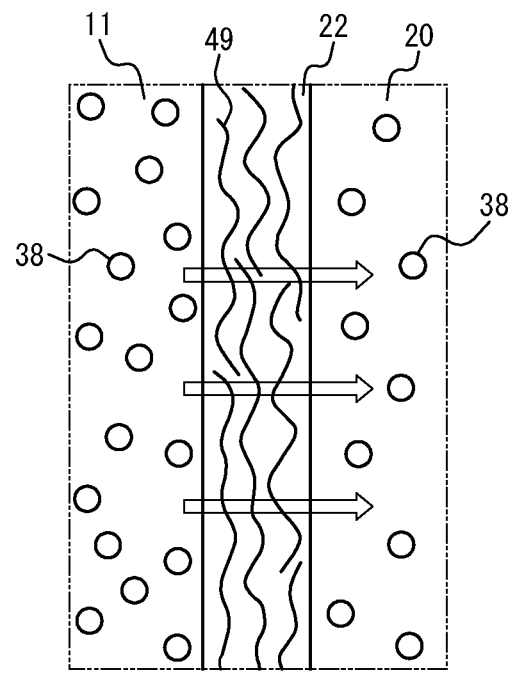

The change in the diffusion rate of the component for recovery via a membrane structure including a stimulus-responsive material that changes from an aggregated state to a swollen state is explained with reference to FIG. 3. In FIG. 3, an example of a stimulus-responsive material 49 being a membrane structure that includes an LCST-type polymer or a UCST-type polymer is described. FIG. 3 is an enlarged illustration of a configuration with a membrane structure that includes an LCST-type polymer or a UCST-type polymer as the diffusion adjustment unit 22 at the border between the recovery unit 20 and the outside of the recovery unit 20 (in the example in FIG. 3, a target introduction unit 11 provided in a component recovery container, described below) in contact with the target that includes the component for recovery 38. In the membrane structure illustrated in FIG. 3, the LCST-type polymer is in an aggregated state (state X) at a temperature higher than the LCST, and the UCST-type polymer is in an aggregated state (state X) at a temperature lower than the UCST. The LCST-type polymer undergoes phase transition to a swollen state (state Y) upon the temperature becoming less than the LCST, and the UCST-type polymer undergoes phase transition to a swollen state (state Y) upon the temperature becoming equal to or greater than the UCST. During the hydrophilic swollen state, the component for recovery 38 in the target can pass through the diffusion adjustment unit 22 (membrane structure) and move to the recovery unit 20. The component for recovery 38 therefore diffuses from outside the recovery unit 20 (inside the target introduction unit 11) to inside the recovery unit 20 in accordance with the difference in concentration of the component for recovery 38 between the inside and outside of the recovery unit 20. The diffusion rate of the component for recovery 38 can thus be changed by temperature control (between two states in the example in FIG. 3, i.e., a state with substantially zero diffusion, and a state in which diffusion occurs) to control the recovery of the component for recovery 38 into the recovery unit 20.

While not being bound by theory, it is thought that in the swollen state (state Y) of the stimulus-responsive material, the ability of the component for recovery 38 to pass through the diffusion adjustment unit 22 (membrane structure) could, for example, (i) enable the component for recovery to pass through a gap in the gel of the stimulus-responsive material forming the diffusion adjustment unit 22 (membrane structure) in the swollen state by the gel becoming low density and (ii) enable water molecules that are the driving force of diffusion to pass through the diffusion adjustment unit 22 (membrane structure) by the stimulus-responsive material becoming hydrophilic in the swollen state.

Although not illustrated, in the case of using a membrane structure such as the one illustrated in FIG. 3 for the diffusion adjustment unit 22, the component recovery mechanism 23 is preferably designed by estimating the amount of contraction of the stimulus-responsive material in advance and providing leeway in the swollen state.

Figure 4X:
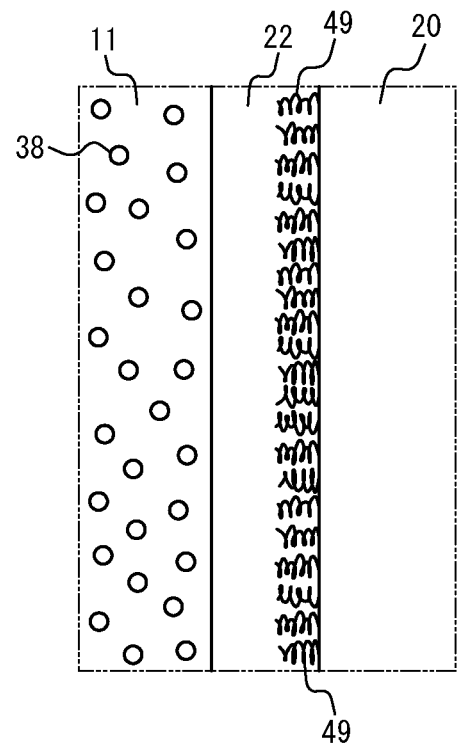
FIG. 4 is a diagram illustrating the change in the diffusion rate of a component for recovery via a membrane structure that includes a temperature-responsive material in an embodiment in which the end portion of the temperature-responsive material is bound to the recovery unit.
Figure 4Y:
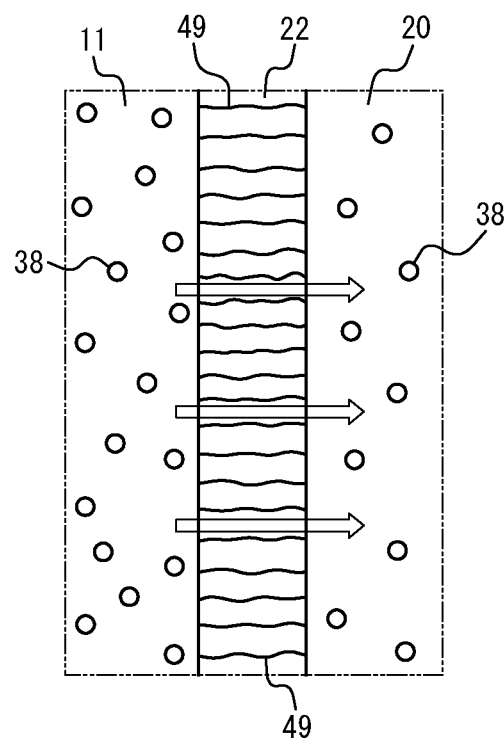

As illustrated in FIG. 4, the diffusion adjustment unit 22 may be configured by binding the end of a stimulus-responsive material 49 that reversibly changes from the aggregated state to the swollen state to the recovery unit 20 and forming a membrane structure to cover the recovery unit 20. FIG. 4 illustrates an enlargement of a configuration in which the end of the stimulus-responsive material 49 is bound to the recovery unit 20, which is to retain the component for recovery 38, and a membrane structure is provided at the border with the outside of the recovery unit 20 (in the example in FIG. 4, the 11 provided in a component recovery container, described below). The stimulus-responsive material 49 in the aggregated state (state X) undergoes phase transition to the swollen state (state Y) in response to a stimulus. In the swollen state, the component for recovery 38 outside the recovery unit 20 (inside the target introduction unit 11 in the example in FIG. 4) passes through the diffusion adjustment unit 22 (membrane structure) into the recovery unit 20. The diffusion rate of the component for recovery 38 into the recovery unit 20 can thus be changed with a stimulus.

The change in the diffusion rate of the component for recovery via a valve including a stimulus-responsive material that changes from an aggregated state to a swollen state is now explained. The volume of the stimulus-responsive material changes upon the stimulus-responsive material changing from an aggregated state to a swollen state in response to a stimulus. Consequently, a member forming the valve deforms by expansion/contraction, bending, or the like to open or close the valve, and the diffusion rate of the component for recovery changes. The diffusion rate of the component for recovery can thus be adjusted by a stimulus via a valve.

Polythiamine, for example, can be used as the above-described pH-responsive material. The amino group of a gel including polythiamine is protonated by the pH being lowered, and the main chain becomes rigid, thereby prompting a change from the aggregated state to the swollen state. Hence, using a membrane structure or a valve that includes a pH-responsive material as the diffusion adjustment unit 22 and adjusting the pH outside the diffusion adjustment unit 22 enables adjustment of the diffusion rate of the component for recovery via the diffusion adjustment unit 22.

A gel with fixed molecules having a molecule recognition function, such as lectin, or a gel with a fixed enzyme can be used as the above-described molecule-responsive material. A gel that includes these molecule-responsive materials changes from the aggregated state to the swollen state according to the presence of molecular bonds. Hence, using a membrane structure or a valve that includes a molecule-responsive material as the diffusion adjustment unit 22 and adjusting the molecular concentration outside the diffusion adjustment unit 22 enables adjustment of the diffusion rate of the component for recovery via the diffusion adjustment unit 22.

Examples of the above-described light-responsive material include polymers containing azobenzene groups and cyclodextrin groups, azobenzene-bound polyacrylic acid, and nitrocinnamic acid esterified polyethylene glycol. A gel formed from these light-responsive materials changes from the aggregated state to the swollen state upon irradiation of light having various wavelengths. Hence, using a membrane structure or a valve that includes a light-responsive material as the diffusion adjustment unit 22 and adjusting the irradiation of light onto the diffusion adjustment unit 22 enables adjustment of the diffusion rate of the component for recovery via the diffusion adjustment unit 22.

The stimulus-responsive material may be a redox-responsive material that responds to redox. Examples of the redox-responsive material include polymers and polymer gels in which a host molecule cyclodextrin (CD) and a redox-responsive guest molecule ferrocene (Fc) are introduced into the side chain. These redox-responsive materials change from an aggregated state to a swollen state upon a change in the cross-linking density inside the gel in accordance with redox. Therefore, when using a membrane structure or a valve including a redox-responsive material as the diffusion adjustment unit 22, the redox state of the redox-responsive material can be changed by adjusting the amount of the oxidant and/or reducing agent outside the diffusion adjustment unit 22, or by providing a stimulus such as electric potential. This enables adjustment of the diffusion rate of the component for recovery via the diffusion adjustment unit 22.

The stimulus-responsive material may be a sound wave-responsive material that responds to sound waves. An example of a sound wave-responsive material is an ultrasonic-wave responsive material. The anti-type binuclear palladium complex anti-1a that includes a pentamethylene chain, reported on by Isozaki et al. (Isozaki et al., 2007), can be used as the ultrasonic-wave responsive material. These ultrasonic wave-responsive materials change from the aggregated state to the swollen state in response to irradiation of ultrasonic waves. Hence, using a membrane structure or a valve that includes a sound wave-responsive material as the diffusion adjustment unit 22 and adjusting the irradiation of sound waves onto the diffusion adjustment unit 22 enables adjustment of the diffusion rate of the component for recovery via the diffusion adjustment unit 22.

The stimulus-responsive material may also be an electric field-responsive polymer material that responds to an electric field. Poly(2-acrylamido-2-methylpropanesulfonic acid-η-butyl methacrylate), for example, can be used as the electric field-responsive polymer material. Poly(2-acrylamido-2-methylpropanesulfonic acid-η-butyl methacrylate) has a negative charge and interacts electrostatically with the component for recovery. This electrostatic interaction is greatly affected by electric fields. Accordingly, use of a membrane structure containing poly(2-acrylamido-2-methylpropanesulfonic acid-η-butyl methacrylate) as the diffusion adjustment unit 22 enables adjustment of the permeability of the component for recovery via the membrane structure by application of an electric field and therefore enables adjustment of the diffusion rate.

The stimulus-responsive material may also be a magnetic field-responsive polymer material that responds to a magnetic field. Examples of the magnetic field-responsive polymer material include an elastic material that has magnetic particles mixed therein or fixed thereto. When a valve member that is the diffusion adjustment unit 22 is formed from a gel that contains these magnetic field-responsive polymer materials, the magnetic particles fixed to the inner elastic material are attracted by the magnetic field, causing the valve member to deform by expansion/contraction, bending, or the like and to open or close. Application of a magnetic field thereby enables adjustment of the diffusion rate of the component for recovery via the diffusion adjustment unit 22.

When the stimulus-responsive material is a polymer material, the stimulus-responsive material can, for example, be a linear polymer or a branched polymer. The stimulus-responsive material may also be a cyclic polymer. The molecules of the stimulus-responsive material may be cross-linked. The stimulus-responsive material may form a polymer brush structure. When the molecular size of the component for recovery is small, the stimulus-responsive material is preferably formed to be highly dense by cross-linking, a polymer brush structure, or the like to avoid unnecessary diffusion of the component for recovery.

In addition to the above-described stimulus-responsive materials, the environment-responsive material may include a control signal receiving material that converts a particular control signal into a stimulus to which the stimulus-responsive material responds. When the environment-responsive material includes a control signal receiving material, a particular control signal can be converted into a stimulus to which the stimulus-responsive material responds. This enables control of the diffusion rate of the component for recovery by the provision of a particular control signal.

The diffusion adjustment unit 22 is preferably a membrane structure or a valve that includes a stimulus-responsive material and a control signal receiving material in at least a portion thereof. The stimulus-responsive material and the control signal receiving material inside the membrane structure or the valve are configured so that the stimulus-responsive material receives a stimulus emitted by the control signal receiving material. In an example, the stimulus-responsive material and the control signal receiving material are cross-linked. Before the stimulus-responsive material is hardened, the control signal receiving material may be mixed and kneaded, with the stimulus-responsive material subsequently being hardened. This allows the stimulus-responsive material and the control signal receiving material to be formed so that the control signal receiving material cannot diffuse from the stimulus-responsive material.

A control signal receiving material that combines well with the stimulus-responsive material can be selected. For example, a near-infrared absorber that absorbs near-infrared rays and generates heat; magnetic nanoparticles that generate heat upon application of an alternating current magnetic field; a photocatalyst, a representative example of which is titanium oxide that absorbs light and exhibits a redox ability; and the like can be used.

The various stimulus-responsive materials described above can be used as the stimulus-responsive material. Among the above-described stimulus-responsive materials, a stimulus-responsive material that changes from an aggregated state to a swollen state in response to a stimulus is preferred.

Among stimulus-responsive materials that change from an aggregated state to a swollen state, a temperature-responsive material is particularly preferable as the stimulus-responsive material. In an example, the environment-responsive material includes a temperature-responsive material as a stimulus-responsive material and includes a near-infrared absorber that absorbs near-infrared rays as a control signal receiving material. The temperature-responsive material changes the diffusion rate of the component for recovery according to a temperature change of the near-infrared absorber. In this configuration, near-infrared rays are used as the control signal, and the near-infrared absorber is used as the control signal receiving material. The near-infrared absorber absorbs near-infrared rays irradiated as a control signal and emits heat. The structure of the temperature-responsive material near the near-infrared absorber changes due to this heat. For example, the permeability of the component for recovery with respect to the diffusion adjustment unit 22 changes, or a valve opens and closes, enabling a change in the diffusion rate of the component for recovery. The temperature-responsive material has a structure that changes reversibly in accordance with temperature. Therefore, when irradiation of near-infrared rays is stopped, and the near-infrared absorber stops emitting heat, the structure of the temperature-responsive material returns to its original state due to a drop in temperature, and the diffusion rate of the component for recovery returns to its original state. The infrared rays do not adversely affect the target, and only the area near the near-infrared absorber is heated. The target is only heated by heat diffusion within a range with no adverse effect. Therefore, according to the present configuration, the recovery of the component for recovery can be controlled in a manner that has a low impact on the target and the component for recovery.

Wavelengths that water molecules tend not to absorb are preferably used for the near-infrared light. For example, wavelengths of 650 nm or greater to 950 nm or less, 1000 nm or greater to 1350 nm or less, and 1500 nm or greater to 1800 nm or less can be used.

Organic compounds, metal structures, carbon structures, or the like can be used as the near-infrared absorber. A material that tends not to precipitate even when mixed with a temperature-responsive material during production is preferred as the near-infrared absorber, and a material with a large surface area is preferred for efficient absorption of near-infrared rays, making use of a small material preferable.

Among metal structures, metal nanorods are preferred as the near-infrared absorber, since the absorption spectrum can be changed by adjustment of the aspect ratio. Gold nanorods are more preferable in terms of stability. Gold nanorods having an equivalent circle diameter in the transverse direction of approximately 5 nm to 100 nm can be used.

Organic dyes are preferred as an organic compound. Suitable examples of organic dyes include a cyanine dye, phthalocyanine dye, naphthalocyanine compound, nickel dithiolene complex, squaryl dye, quinone compound, diimmonium compound, azo compound, porphyrin compound, dithiol metal complex, naphthoquinone compound, and diimmonium compound.

Resin particles containing an organic dye may be used as the organic compound. The resin containing an organic dye is not limited to being particulate in shape. Having the organic dye be contained in resin can suppress leakage of the organic dye into the target and is therefore effective for preventing the organic dye from affecting the target.

Carbon nanotubes, fullerene, carbon nanowire, and the like can suitably be used as carbon structures. Carbon nanotubes with a diameter of approximately 0.4 nm to 50 nm can be used.

These near-infrared absorbers can be used alone, or a plurality thereof can be used in combination.

A suitable functional group may be added by modification to these near-infrared absorbers for cross-linking with the temperature-responsive material. In particular, when a metal structure or a carbon structure is used as the near-infrared absorber, a functional group is preferably added to the surface by modification for cross-linking with the temperature-responsive material. The functional group added to the metal structure may, for example, be a methyl group, amino group, carboxyl group, or the like. The functional group added to the carbon structure may, for example, be a methylol group, nitro group, carboxyl group, acyl chloride group, boronic acid group, or the like.

The diffusion adjustment unit 22 is preferably a membrane structure or a valve that includes a temperature-responsive material and a near-infrared absorber in at least a portion thereof. In an example, a membrane structure or a valve includes a cross-linked body in which a temperature-responsive material and a near-infrared absorber are cross-linked by a cross-linking agent, and a structural change in the cross-linked body due to irradiation of near-infrared rays changes the diffusion rate of the component for recovery.

Figure 5X:
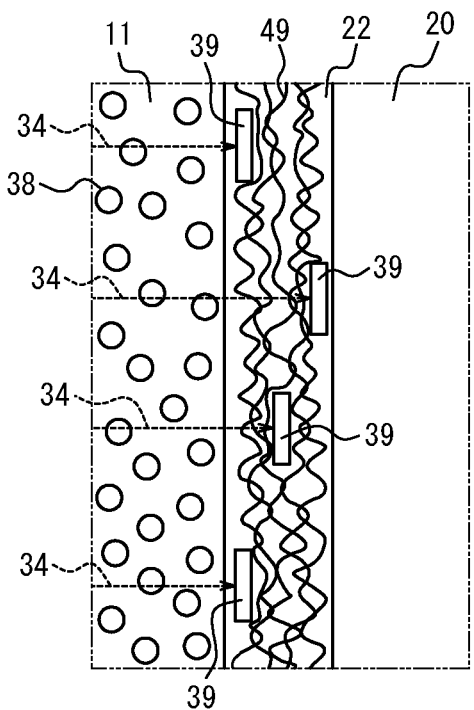
FIG. 5 is a diagram illustrating how transmission of near-infrared rays to a membrane structure including a temperature-responsive material and a near-infrared absorber yields a change in the diffusion rate of the component for recovery via the membrane structure.
Figure 5Y:
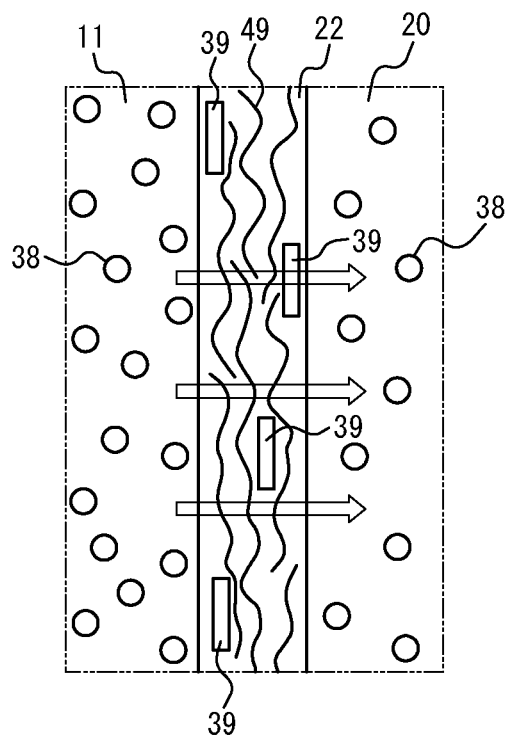

With reference to FIG. 5, the change in the diffusion rate of the component for recovery via a membrane structure including a stimulus-responsive material, which changes from an aggregated state to a swollen state, and a control signal receiving material is explained. FIG. 5 illustrates an example in which transmission of near-infrared rays to a membrane structure including a temperature-responsive material and a near-infrared absorber yields a change in the diffusion rate of a component for recovery via the membrane structure. The example in FIG. 5 is an enlarged illustration of a configuration with a membrane structure that includes a UCST-type polymer that is the stimulus-responsive material 49 and the near-infrared absorber 39 as the diffusion adjustment unit 22 at the border between the recovery unit 20 and the outside of the recovery unit 20 (in the example in FIG. 5, a target introduction unit 11 provided in a component recovery container, described below) in contact with the target that includes the component for recovery 38. While not illustrated, the near-infrared absorber 39 and the UCST-type polymer are cross-linked. As illustrated in FIG. 5, the UCST-type polymer included in the membrane structure is in an aggregated state (state X) at a temperature lower than the UCST. When near-infrared rays (control signal 34) are irradiated on this membrane structure, the near-infrared absorber 39 absorbs the near-infrared rays and generates heat. The temperature around the near-infrared absorber 39 then locally rises. When the temperature becomes equal to or greater than the UCST due to this temperature rise, the UCST-type polymer undergoes a phase transition to the swollen state (state Y). During the hydrophilic swollen state, the component for recovery 38 in the target can pass through the diffusion adjustment unit 22 (membrane structure). The component for recovery 38 therefore diffuses from outside the recovery unit 20 (inside the target introduction unit 11) to inside the recovery unit 20 in accordance with the difference in concentration of the component for recovery 38 between the inside and outside of the recovery unit 20. The diffusion rate of the component for recovery 38 can thus be changed by irradiation of infrared rays.

While not illustrated, the membrane structure may include an LCST-type polymer. Contrary to the aforementioned case, irradiation of near-infrared rays causes the LCST-type polymer included in the membrane structure to undergo a phase transition from the swollen state (state Y) to the aggregated state (state X) in this case, enabling the diffusion rate of the component for recovery 38 to be changed.

Figure 6X:
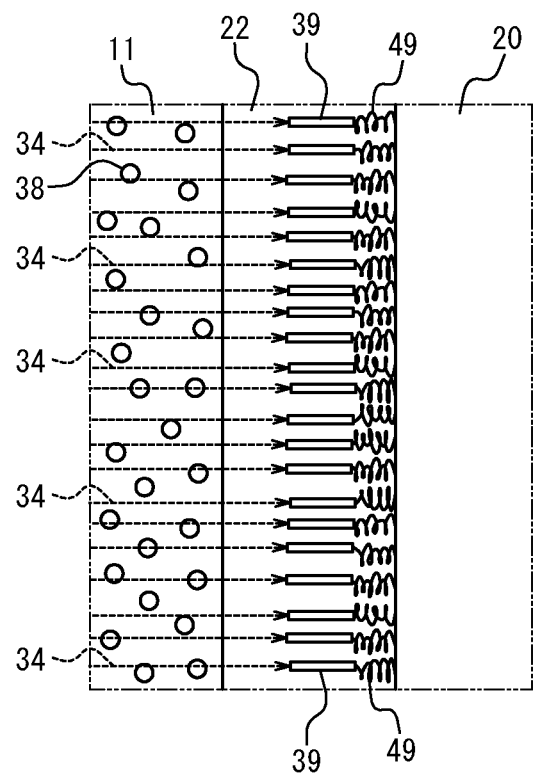
FIG. 6 is a diagram illustrating how transmission of near-infrared rays to a membrane structure including a temperature-responsive material and a near-infrared absorber yields a change in the diffusion rate of the component for recovery via the membrane structure in an embodiment in which the end portion of the temperature-responsive material is bound to the recovery unit.
Figure 6Y:
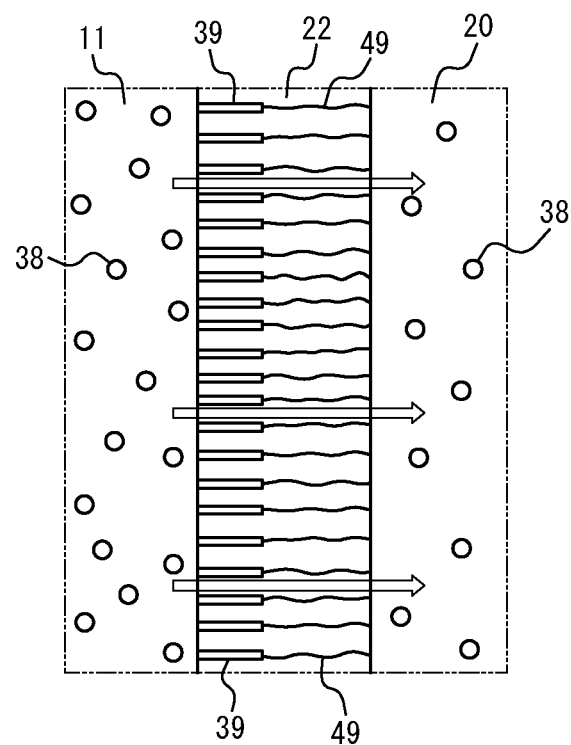

As illustrated in FIG. 6, the diffusion adjustment unit 22 may be configured by binding one end of a stimulus-responsive material 49 that reversibly changes from the aggregated state to the swollen state to the recovery unit 20, binding the other end to a control signal receiving material (the near-infrared absorber 39 in the example in FIG. 6), and forming a membrane structure to cover the recovery unit 20. FIG. 6 illustrates an enlargement of a configuration in which one end of the stimulus-responsive material 49 is bound to the recovery unit 20, which is to retain the component for recovery 38, the other end is bound to a control signal receiving material (the near-infrared absorber 39 in the example in FIG. 6), and a membrane structure is provided at the border with the outside of the recovery unit 20 (in the example in FIG. 6, the 11 provided in a culture container, described below). When the control signal 34, such as near-infrared rays, is irradiated onto the membrane structure, the control signal receiving material (the near-infrared absorber 39 in the example in FIG. 6) receives the control signal 34 and converts the control signal 34 to a stimulus to which the stimulus-responsive material 49 responds. The stimulus-responsive material 49 in the aggregated state (state X) receives the stimulus converted by the control signal receiving material and undergoes phase transition to the swollen state (state Y). In the swollen state, the component for recovery 38 outside the recovery unit 20 (inside the target introduction unit 11 in the example in FIG. 6) passes through the diffusion adjustment unit 22 (membrane structure) into the recovery unit 20. The diffusion rate of the component for recovery 38 can thus be changed with a stimulus.

Figure 1C:
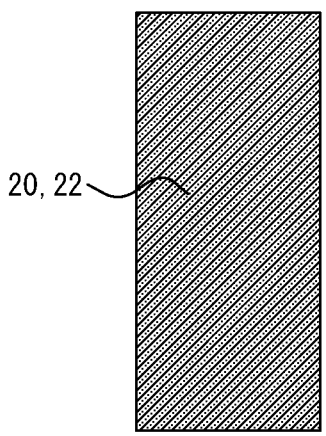

The recovery unit 20 and the diffusion adjustment unit 22 may include the same material. In an embodiment, the component recovery mechanism 23 includes a stimulus-responsive material that changes from the aggregated state to the swollen state in response to a stimulus, as illustrated in FIG. 1C. The stimulus-responsive material can thereby be caused to function both as the recovery unit 20 and the diffusion adjustment unit 22. Provision of a stimulus to the component recovery mechanism 23 causes the stimulus-responsive material to change from the aggregated state to the swollen state. At the time of this change, the component for recovery that was present outside the stimulus-responsive material in the aggregated state can move inside the stimulus-responsive material in the swollen state. Recovery of the component for recovery can thus be controlled by a stimulus. Formation of the recovery unit 20 and the diffusion adjustment unit 22 from the same material in this way can facilitate production of the component recovery mechanism 23.

Alternatively, in the embodiment in FIG. 1C, the component recovery mechanism 23 may include, as the stimulus-responsive material, an electric field-responsive polymer material that responds to an electric field, and the component for recovery may be enclosed in the electric field-responsive polymer material to combine the functions of the recovery unit 20 and the diffusion adjustment unit 22. Poly(2-acrylamido-2-methylpropanesulfonic acid-η-butyl methacrylate), for example, can be used as the electric field-responsive polymer material. Poly(2-acrylamido-2-methylpropanesulfonic acid-η-butyl methacrylate) has a negative charge and interacts electrostatically with the component for recovery. This electrostatic interaction is greatly affected by electric fields. Accordingly, by the recovery unit 20 including an electric field-responsive polymer material such as poly(2-acrylamido-2-methylpropanesulfonic acid-η-butyl methacrylate), the electrostatic interaction between the component for recovery and the electric field-responsive polymer material can be changed by application of an electric field, and the diffusion coefficient of the component for recovery can be changed, enabling adjustment of the diffusion rate of the component for recovery into the component recovery mechanism 23.

In the present embodiment, the above-described temperature-responsive material, pH-responsive material, molecule-responsive material, light-responsive material, redox-responsive material, sound wave-responsive material, and the like can suitably be used as a stimulus-responsive material that changes from the aggregated state to the swollen state in response to a stimulus. In the present embodiment, the component recovery mechanism 23 may include a control signal receiving material in addition to the stimulus-responsive material. Details of the stimulus-responsive material and the control signal receiving material are as above and are therefore omitted here.

[Recovery Unit]

The recovery unit 20 retains the component for recovery that moves into the recovery unit 20 via the above-described diffusion adjustment unit 22. The recovery unit 20 may have any specific form, but a porous material capable of enclosing the component for recovery is preferably included in at least a portion of the recovery unit 20. The entire recovery unit 20 is more preferably formed by a porous material. The porous material may be a polymer gel, such as a chemical gel based on covalent bonds or a physical gel based on non-covalent intermolecular forces or the like, or may be a polymer gel in which covalent bonds and noncovalent intermolecular forces contribute to formation of the gel structure. Specifically, the following can be used as the porous material: hydrogels formed from sugar chains such as agarose, dextrin, pectin, sodium alginate, and xanthan gum; hydrogels formed from proteins such as collagen, hyaluronic acid, elastin, and gelatin; hydrogels formed from synthetic polymers such as polyacrylamide, polyethylene glycol, and silicone; and inorganic materials such as mesoporous carbon, mesoporous aluminosilicate, and mesoporous silica. A hydrogel is more preferably included in a portion of the recovery unit, as doing so facilitates formation of pores roughly equivalent to various components for recovery.

The average pore diameter of the porous material can be selected according to the molecular weight and molecular size of the component for recovery and is not particularly limited but can, for example, be 5 nm or more and 1 mm or less. The average pore diameter of the porous material is preferably 50 nm or more and is preferably 20 µm or less.

The recovery unit 20 may be configured to be removable from the component recovery mechanism 23. This allows for extraction of the component for recovery that has moved into the recovery unit 20 without going through the diffusion adjustment unit 22, thereby facilitating extraction of the component for recovery after component recovery.

In an example, the recovery unit 20 has a re-diffusion suppression mechanism that suppresses re-diffusion of the component for recovery from the recovery unit 20 to the target. The re-diffusion suppression mechanism suppresses re-diffusion of the component for recovery to the target by adsorption, binding, affinity, or the like with the component for recovery. The re-diffusion suppression mechanism may also suppress the re-diffusion of the component for recovery by agglomerating the component for recovery in the recovery unit 20 with a flocculant, such as polyaluminum chloride or polyacrylamide, to increase the size of the component for recovery. By the recovery unit 20 including the re-diffusion suppression mechanism that suppresses re-diffusion of the component for recovery to the target, re-diffusion of the component for recovery to the target can be prevented, and the component for recovery can be recovered more efficiently. The re-diffusion rate from the recovery unit 20 to the target is reduced by the re-diffusion suppression mechanism. The average re-diffusion rate from the recovery unit 20 to the target is preferably 100 nmol/h×mm$^2$ or less, and more preferably 1 pmol/h×mm$^2$ or less. The average re-diffusion rate from the recovery unit 20 to the target causes the recovery unit 20 that has the affinity unit to recover the component for recovery to an equilibrium state. After recovery of the component for recovery, the recovery unit 20 is cleaned with a cleaning fluid. Here, a liquid, more preferably an aqueous solution, and even more preferably a saline solution, having a pH, ionic strength, salt composition, and the like similar to those of the target is preferably used as the cleaning fluid. After cleaning, the 1 mm$^2$ recovery unit 20 is immersed in 200 µL of saline solution for 1 hour. As illustrated in FIG. 1C, when the recovery unit 20 and the diffusion adjustment unit 22 contain the same material, the recovery unit 20 is wetted in a maximally swollen state. The solvent after wetting of the recovery unit 20 is recovered, and the amount of material of the re-diffused component for recovery in the solvent is measured by HPLC or ELISA. If the component for recovery is labeled with fluorescence, a radioisotope, or the like, the rediffusion rate of the component for recovery can be measured by measuring the fluorescence or radiation according to the labeling.

Since the component recovery mechanism 23 is intended to recover the component for recovery, the concentration of the component for recovery in the recovery unit 20 is usually lower than the concentration of the component for recovery in the target. In order to suitably diffuse the component for recovery from the target to the recovery unit 20, the recovery unit 20 preferably does not contain the component for recovery before the recovery of the component for recovery is performed. Before recovery of the component for recovery, the recovery unit 20 with a volume of 100 μL is preferably wetted for 1 hr in 1 mL of saline solution containing 100 ng/mL or less, which is 0.5 pmol/L or less, of the component for recovery at 25° C., after which the concentration of the component for recovery in the saline solution preferably becomes 1.0 pmol/L or less, more preferably 1% or less. The recovery unit 20 preferably does not contain pharmaceutically active ingredients. The amount of pharmaceutically active ingredients contained in the recovery unit 20 is preferably equal to or less than the effective amount. The amount of pharmaceutically active ingredients contained in the recovery unit 20 is preferably equal to or less than 0.5 mg.

The recovery unit 20 may include an affinity unit with affinity for the component for recovery. By the recovery unit 20 including an affinity unit with affinity for the component for recovery in this way, a specific component for recovery can be recovered more efficiently. Furthermore, by the recovery unit 20 including the re-diffusion suppression mechanism that suppresses re-diffusion of the component for recovery from the recovery unit 20 to the target in this way, the component for recovery can be recovered at a higher concentration. In an example, the affinity unit exhibits affinity for the component for recovery by one, or a combination of two or more, selected from the group consisting of intermolecular forces, electrostatic interactions, hydrophobic interactions, hydrogen bonds, covalent bonds, and coordination bonds.

The affinity unit can include an affinity substance with affinity for the component for recovery. Examples of the affinity substance include an antibody, antibody fragment, or aptamer that specifically binds to a particular component for recovery, such as a protein; single-stranded DNA that specifically binds to a nucleic acid having a particular base sequence; and a lectin that specifically binds to a sugar chain. If the component for recovery contains biotin, the affinity unit can be an avidin protein; if the component for recovery contains a histidine tag, the affinity unit can be a material containing a metal ion such as nickel or cobalt; and if the component for recovery contains a glutathione S-transferase tag, the affinity unit 24 can be a material containing glutathione. The affinity unit can also be a molecularly imprinted material that specifically recognizes the component for recovery. The affinity unit can be a zeolite that can only capture molecules of a certain size or less.

The affinity unit can also include a functional group with affinity for the component for recovery. Examples of such a functional group include hydrophilic groups such as hydroxyl groups, amino groups, imino groups, sulfonic groups, active ester groups, and carboxyl groups; and hydrophobic groups such as alkyl groups, phenyl groups, and fluoroalkyl groups. For suitable extraction of the component for recovery from the recovery unit 20 after recovery, the bond between the functional group and the component for recovery is preferably a non-covalent bond.

The recovery unit 20 can be provided with one, or with a combination of a plurality, of the above-described affinity units 24. When the component for recovery is to be recovered specifically, the recovery unit 20 is preferably provided with an affinity unit 24 that recognizes the component for recovery with high specificity. On the other hand, a lower specificity may be preferable depending on the application, such as when a wide range of components having characteristics similar to those of a particular substance are to be recovered. By the recovery unit 20 being provided with a combination of a plurality of affinity units 24, the affinity between the recovery unit 20 and the component for recovery can be suitably adjusted according to the properties of the component for recovery and the purpose of recovery.

Figure 7:
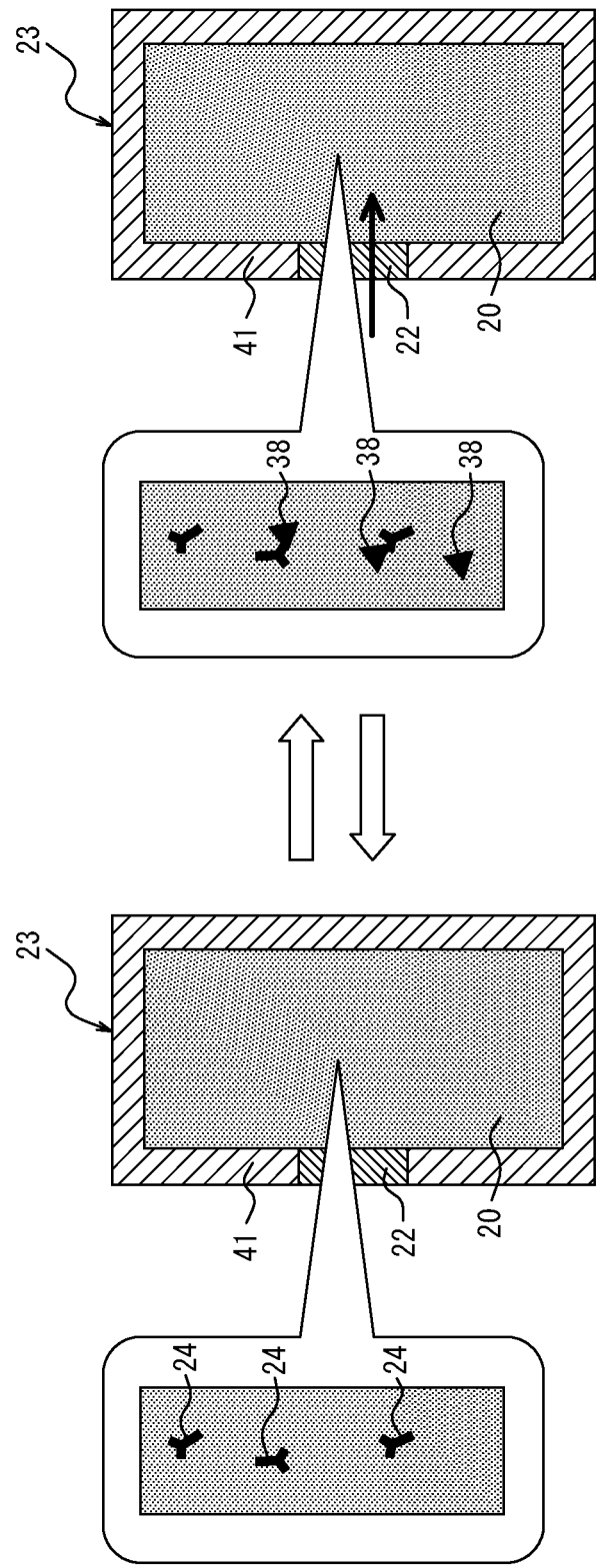
FIG. 7 is an overview illustrating an example, and operations thereof, of an embodiment in which the recovery unit includes an affinity unit with affinity for the component for recovery.

The form in which the affinity unit 24 is provided within the recovery unit 20 is not particularly limited. In one example, as illustrated in FIG. 7, the recovery unit 20 includes a porous material, and the affinity unit 24 is retained in the porous material. In such a recovery unit 20, the component for recovery 38 that diffused into the recovery unit 20 via the diffusion adjustment unit 22 due to a change in an environmental parameter is suitably retained in the affinity unit 24. When the affinity unit 24 includes an affinity substance or functional group, the affinity substance or functional group is, for example, cross-linked to the porous material. In FIG. 7, an example is illustrated in which the affinity unit 24 is an antibody, but when the antibody is cross-linked to the porous material, the stationary portion of the antibody is preferably cross-linked to the porous material so as not to affect the antigen-antibody reaction. In one example, the affinity unit 24 includes biotin or avidin, biotin or avidin is added to the porous material in correspondence with the affinity unit 24, and the affinity unit 24 is retained in the porous material by the strong affinity between biotin and avidin.

Figure 8:
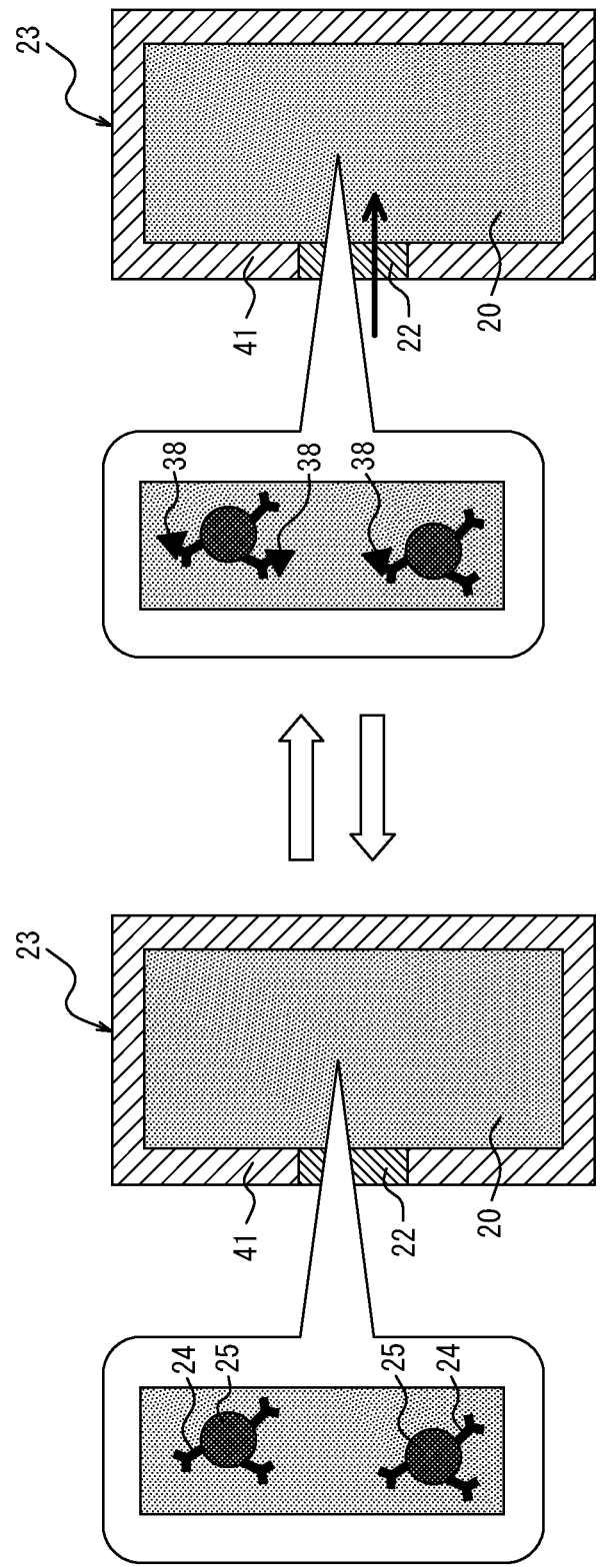
FIG. 8 is an overview illustrating an example, and operations thereof, of an embodiment in which the recovery unit includes an affinity substance or functional group bound to porous material via a carrier.

In one example, as illustrated in FIG. 8, the recovery unit 20 includes a porous material, the affinity unit 24 includes an affinity substance or functional group bound to the porous material via a carrier 25, and the outer diameter of the carrier 25 is greater than the maximum pore diameter of the porous material in a swollen state. Here, the maximum pore diameter of the porous material is the value measured for the porous material in the state without the carrier 25. In a state in which the diffusion of the component for recovery 38 into the recovery unit 20 is suppressed, the carrier 25 does not flow out, but in a state in which the diffusion of the component for recovery 38 into the recovery unit 20 is promoted, the carrier 25 may flow out. However, if the outer diameter of the carrier 25 is larger than the maximum pore diameter of the porous material in the swollen state, the carrier 25 bound to the affinity substance or the functional group is retained in the porous material. By the affinity substance or functional group being indirectly retained in the recovery unit 20 via the carrier in this way, various affinity substances or functional groups can be bound to the porous material, and various types of components for recovery 38 can be recovered. The "swollen state" of the porous material refers to the state in which the volume of the porous material is maximized. The carrier and the binding substance may be directly bound or may be bound via a molecule such as protein A. The carrier may be configured by agarose, dextran, polyacrylamide, polyethylene glycol, or the like, or a cross-linked body of these with a cross-linking agent. The recovery unit 20 can be produced by kneading the porous material before curing with a carrier 25 containing an affinity substance or functional group, and then curing the porous material.

As illustrated in FIG. 1C, when the component recovery mechanism 23 includes a stimulus-responsive material that changes from an aggregated state to a swollen state in response to a stimulus, the affinity unit 24 may be retained in the stimulus-responsive material. In an example, the affinity unit 24 includes an affinity substance or functional group, and the affinity substance or functional group is cross-linked to the stimulus-responsive material. Provision of a stimulus to the component recovery mechanism 23 causes the stimulus-responsive material to change from the aggregated state to the swollen state. At the time of this change, the component for recovery that was present outside the stimulus-responsive material in the aggregated state moves inside the stimulus-responsive material in the swollen state and has affinity with the affinity unit 24 retained in the stimulus-responsive material. Formation of the recovery unit 20 and the diffusion adjustment unit 22 from the same material in this way can facilitate production of the component recovery mechanism 23 that includes the affinity unit 24.

The recovery unit 20 may be in a state with room to absorb a liquid. By the recovery unit 20 being in a state with room to absorb a liquid, the component for recovery can be recovered more quickly than by diffusion alone. The method of placing the recovery unit 20 in a state with room to absorb a liquid is not particularly limited, but for example, the recovery unit 20 can be dried. Drying of the recovery unit 20 enables quick recovery of the component for recovery and can also prevent components in the recovery unit 20 from mixing with the target. Furthermore, even in a case in which a substance that may be degraded by moisture is retained in advance in the recovery unit 20 as the above-described affinity unit, the drying of the recovery unit 20 enables stable storage of the substance. The recovery unit 20 may also include a water-absorbent material. By inclusion of a water-absorbent material in the recovery unit 20, the water absorption rate of the recovery unit 20 can be increased, and faster recovery can be achieved. The water absorption rate of the recovery unit 20 is preferably 10% or more and 500% or less. The water absorption rate of the recovery unit 20 is more preferably 30% or more and 200% or less. The water absorption rate of the recovery unit 20 is a value measured in accordance with ASTM D570. Specifically, a test piece with a diameter of 2 inches and a thickness (0.125 or 0.250 inches) is first cut out from the recovery unit, and the mass of the test piece is measured. Subsequently, the test piece is immersed in water at 23° C. for 24 hours, and the mass of the test piece after immersion is measured. The ratio of the mass of the test piece increased by immersion to the mass of the test piece before immersion is then calculated as the water absorption rate (%).

(Impermeable Unit)

The impermeable unit 41 does not diffuse or transmit the component for recovery. The impermeable unit 41 may have any specific form but is preferably formed from a material that does not have affinity with the component for recovery. The impermeable unit 41 is, for example, formed from an organic material such as a hydrophobic polymer or an inorganic material such as a metal thin film. In an embodiment for adjusting the diffusion rate with the control signal 34, the impermeable unit 41 is preferably formed from a hydrophobic polymer, as this configuration does not block the control signal 34. The surface of the porous material used as the recovery unit 20 may be cross-linked to form the impermeable unit 41.

While not illustrated, the surface on the outer side of the recovery unit 20 may be covered with a different material from the material forming the recovery unit 20. Covering the surface on the outer side of the recovery unit 20 with a different material from the material forming the recovery unit 20 can prevent adsorption of components in the component for recovery or the culture medium on the impermeable unit 41, leakage of components of the recovery unit 20 into the culture medium, and the like. Furthermore, covering the surface on the outer side of the recovery unit 20 with a different material from the material forming the recovery unit 20 can suitably suppress contamination when the recovery unit 20 is removed from the component recovery mechanism 23.

FIGS. 1A to 1C illustrate examples of the component recovery mechanism 23 having an overall rectangular shape, but the overall shape of the component recovery mechanism 23 is not limited to being rectangular. For example, the overall shape of the component recovery mechanism 23 may be spherical. The component recovery mechanism 23 is particularly easy to produce when the overall shape of the component recovery mechanism 23 is spherical. For example, a spherical component recovery mechanism 23 with the form illustrated in FIG. 1B or FIG. 1C can be produced, without use of a mold, to have an overall spherical shape by a method for dripping a material solution into a liquid (liquid drip method).

[Target]

The target from which component for recovery is recovered can be selected according to the purpose. For example, the target can be a culture medium in which a culture target such as a cell or a microorganism is cultured. The target may also be a reaction solution of a biochemical reaction such as a polymerase chain reaction (PCR) or cell-free protein synthesis. The target may also be a reaction solution of a chemical reaction. The target is not limited to a liquid state, but may be in a gel state, for example, as long as the component for recovery can move to the recovery unit 20 by diffusion. As described below, it suffices for the target to contain the component for recovery at the time of component recovery. For example, while culturing or a biochemical reaction is performed in the target, a secretion secreted by the culture target or the reaction product generated by the biochemical reaction may be recovered as the component for recovery.

[Component for Recovery]

The component for recovery can be selected according to the purpose. For example, the component for recovery may be a protein, a low molecular weight compound, a sugar, a sugar chain, a nucleic acid, a lipid, a metabolite, or a cell associated with a culture or a biochemical reaction. The component for recovery may also be a reactant, a reaction product, a by-product of a chemical reaction, or the like. Proteins known to function as biological signals, such as differentiation-inducing factors, cell growth factors, antibodies, hormones, and chemokines, can be the component for recovery. Low molecular weight compounds, such as inhibitors or antibiotics that bind to enzymes and receptors and inhibit their activity, can be the component for recovery. A surfactant may also be the component for recovery. The component for recovery may be vesicles, such as exosomes and liposomes, that include a plurality of components; biomaterial extracts; and cell secretions. The component for recovery is not limited to a chemical substance and may also be a virus.

One type or a plurality of types of components for recovery may be recovered by one component recovery mechanism. The type of component for recovery that is recovered by the component recovery mechanism can be adjusted by the type of affinity unit 24 and the pore diameter of the porous material in the recovery unit.

Extraction of Recovered Component for Recovery

After the component for recovery is recovered using the above-described component recovery mechanism 23, the component for recovery can, for example, be extracted from the component recovery mechanism 23 as follows. In one example, an environmental parameter is changed to allow the component for recovery to diffuse through the diffusion adjustment unit 22, and the component recovery mechanism 23 is then immersed in a buffer. The recovery unit 20 may be removed from the component recovery mechanism 23, and the recovery unit 20 alone may be immersed in the buffer. A buffer having a lower concentration of the component for recovery than the concentration in the recovery unit 20 is used as the buffer. A buffer that does not contain the component for recovery is preferably used as the buffer. The difference in concentration of the component for recovery between the buffer and the inside of the recovery unit 20 enables the component for recovery to diffuse from the recovery unit 20 into the buffer. In another example, the recovery unit 20 is removed from the component recovery mechanism 23 and then dissolved by enzymes, heat, acid, alkali, or the like to recover the component for recovery.

[Component Recovery Container]

Figure 9:
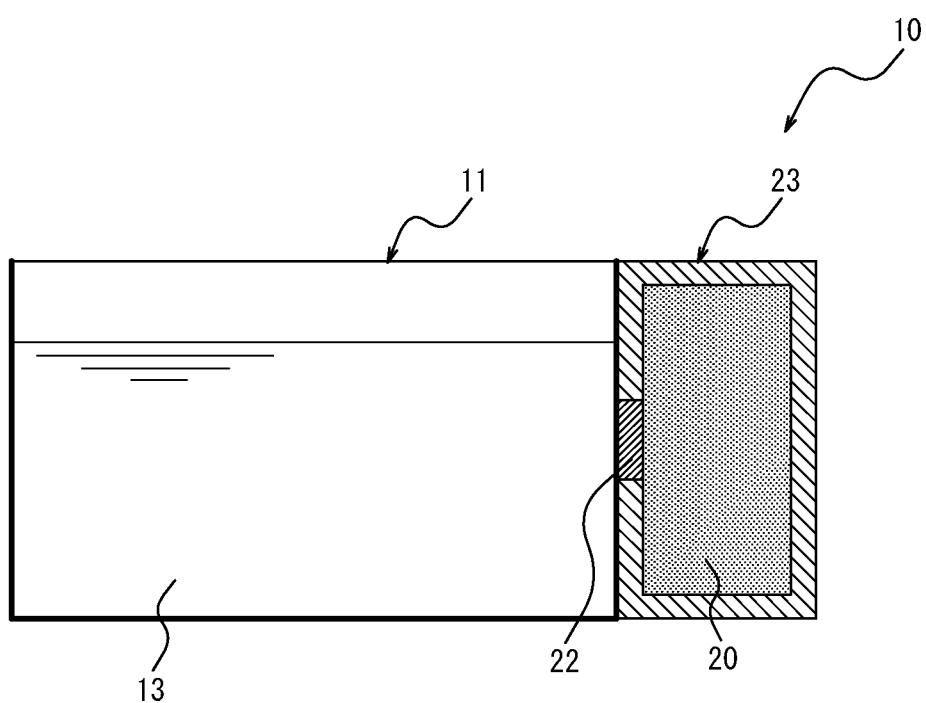
FIG. 9 is a diagram schematically illustrating an example embodiment of a component recovery container.

The component recovery container of the present disclosure is a container for recovering at least the component for recovery. As described below, in an embodiment, the component recovery container can be a container capable not only of recovering the component for recovery, but also of recovering the component for recovery from the target at a predetermined timing while culturing, a biochemical reaction, or a chemical reaction is performed. FIG. 9 schematically illustrates an example of a component recovery container. As illustrated in FIG. 9, the component recovery container 10 includes the above-described component recovery mechanism 23 and a target introduction unit 11 into which a target 13 is introduced. During component recovery, as illustrated in FIG. 9, the diffusion adjustment unit 22 is in contact with the target 13. When the target 13 is liquid, the target 13 permeates the diffusion adjustment unit 22 from the target introduction unit 11 and comes in contact with the recovery unit 20, enabling diffusion of the component for recovery from the target 13 to the recovery unit 20. Therefore, by the diffusion adjustment unit 22 adjusting the diffusion rate of the component for recovery from outside the recovery unit 20 to inside the recovery unit 20, recovery of the component for recovery from the target 13 can be controlled efficiently and easily. While not illustrated, a lid may be provided as appropriate on the target introduction unit 11.

The position of the component recovery mechanism 23 within the component recovery container 10 is not particularly limited, but the diffusion adjustment unit 22 needs to be in contact with the target 13 during component recovery. The component recovery mechanism 23 may be configured to be non-removable from the component recovery container 10, but the component recovery mechanism 23 may be a replaceable member that is removable from the component recovery container 10. When the component recovery mechanism 23 is thus a replaceable member that is removable from the component recovery container 10, the component recovery container 10 can easily be configured according to the purpose. The recovery unit 20 may be a replaceable member that is removable from the component recovery container 10. The component recovery mechanism 23 or the recovery unit 20 is preferably configured to be removable from the component recovery container 10 while maintaining the target introduction unit 11 in a sealed state. When removal is thus possible while maintaining the sealed state of the target introduction unit 11, the recovered component for recovery can be removed from the component recovery container 10 while maintaining the sealed state of the target introduction unit 11.

As described above, when the recovery unit 20 is in a state with room to absorb a liquid, the component recovery container 10 is preferably designed so that the amount of liquid absorbed by the recovery unit 20 is 1% or less of the amount of liquid contained in the target, so that the amount of liquid in the target 13 does not decrease excessively during recovery of the component for recovery.

The material of the target introduction unit 11 is not particularly limited and may, for example, be plastic, glass, ceramic, metal, or the like. The target introduction unit 11 may be coated to prevent adsorption of the component for recovery. This configuration can reduce the loss due to the component for recovery being adsorbed on the target introduction unit 11. The target introduction unit 11 may also be made more useful by being disposable.

As described above, the target 13 may be in a gel state instead of a liquid state. When the target 13 is in a gel state, the diffusion adjustment unit 22 in an example is immersed in advance in a liquid that does not adversely affect the target 13. By immersion of the diffusion adjustment unit 22 in the liquid in advance, the liquid permeates the diffusion adjustment unit 22 and comes in contact with the recovery unit 20, and the component for recovery is suitably diffused from the target 13 into the recovery unit 20.

The basic configuration of the component recovery container 10 has been described, but the component recovery container 10 may also be configured as described below.

Figure 10A:
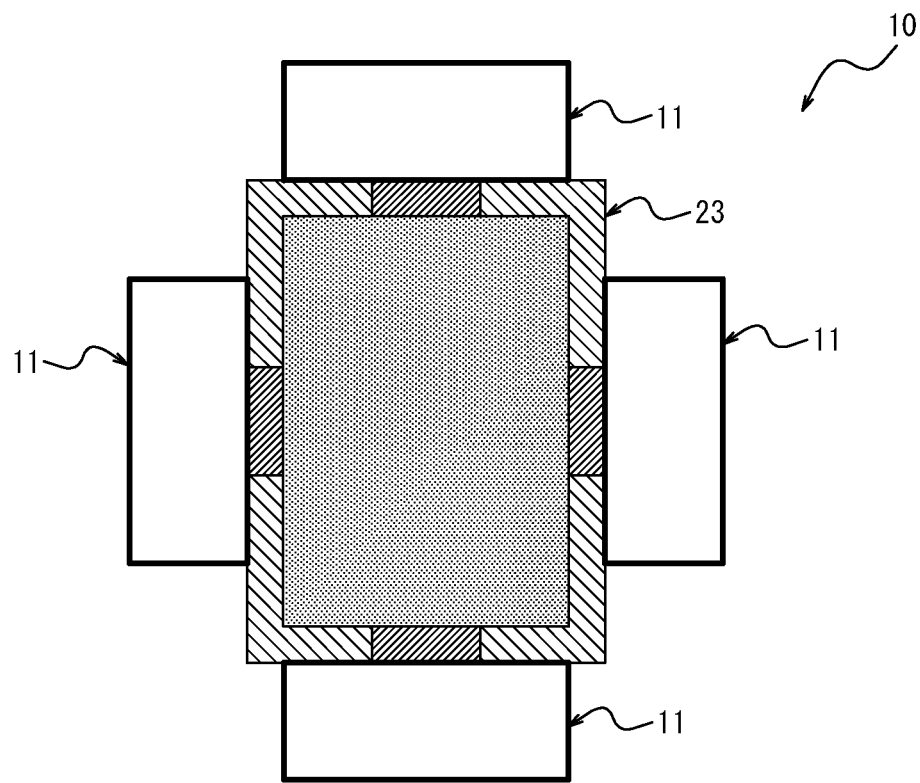
FIGS. 10A and 10B are diagrams schematically illustrating an example of a component recovery container that includes a plurality of target introduction units, where

FIG. 10A schematically illustrates another embodiment of a component recovery container. FIG. 10A is an overview of an example of a component recovery container 10 according to the present embodiment as seen from above. As illustrated in FIG. 10A, the component recovery container 10 may include a plurality of target introduction units 11. By one component recovery container 10 including a plurality of target introduction units 11, the component for recovery contained in the plurality of target introduction units 11 can be recovered in parallel, so that a large amount of the component for recovery can be recovered efficiently.

As illustrated in FIG. 10A, the plurality of target introduction units 11 in an example are disposed to surround the component recovery mechanism 23. To recover the component for recovery from each of the target introduction units 11, a plurality of diffusion adjustment units 22 are disposed in the component recovery mechanism 23 to be in contact with the target 13 introduced in each target introduction unit 11. Specifically, the component recovery container 10 illustrated in FIG. 10A includes a plurality (four in the illustrated example) of target introduction units 11 and a component recovery mechanism in which a plurality (the same number as the number of target introduction units 11) of diffusion adjustment units 22 are provided for one recovery unit. The recovery units and the target introduction units 11 are in contact via the diffusion adjustment unit 22.

Figure 10B:
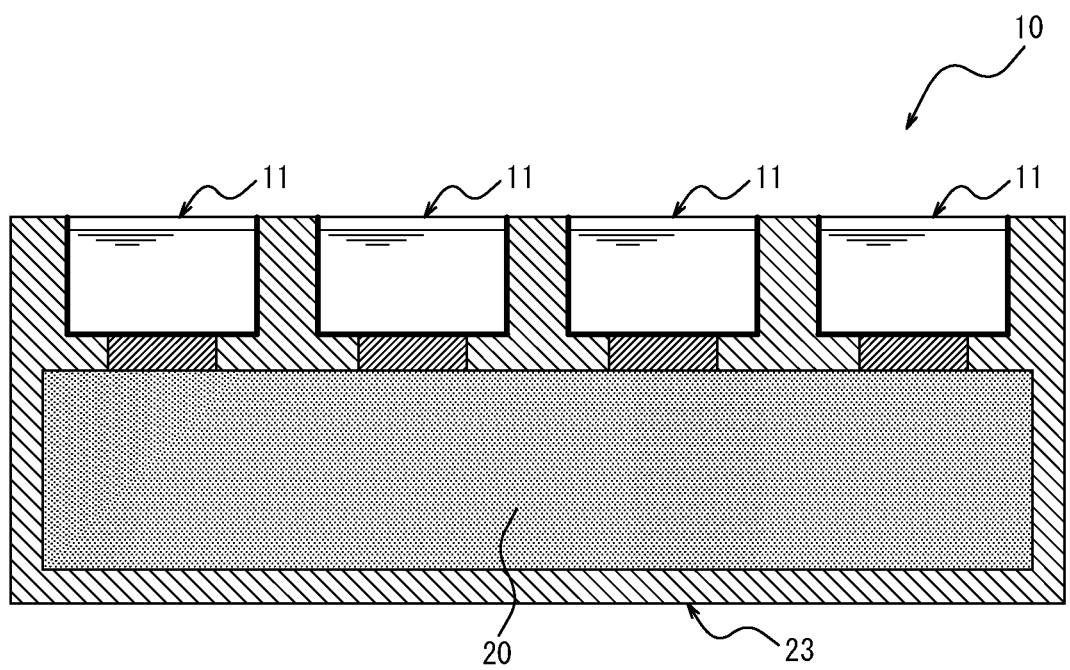

FIG. 10B schematically illustrates a cross-section of another example of the component recovery container 10. As illustrated in FIG. 10B, the plurality of target introduction units 11 may be provided on one side of the component recovery mechanism 23.

Figure 11:
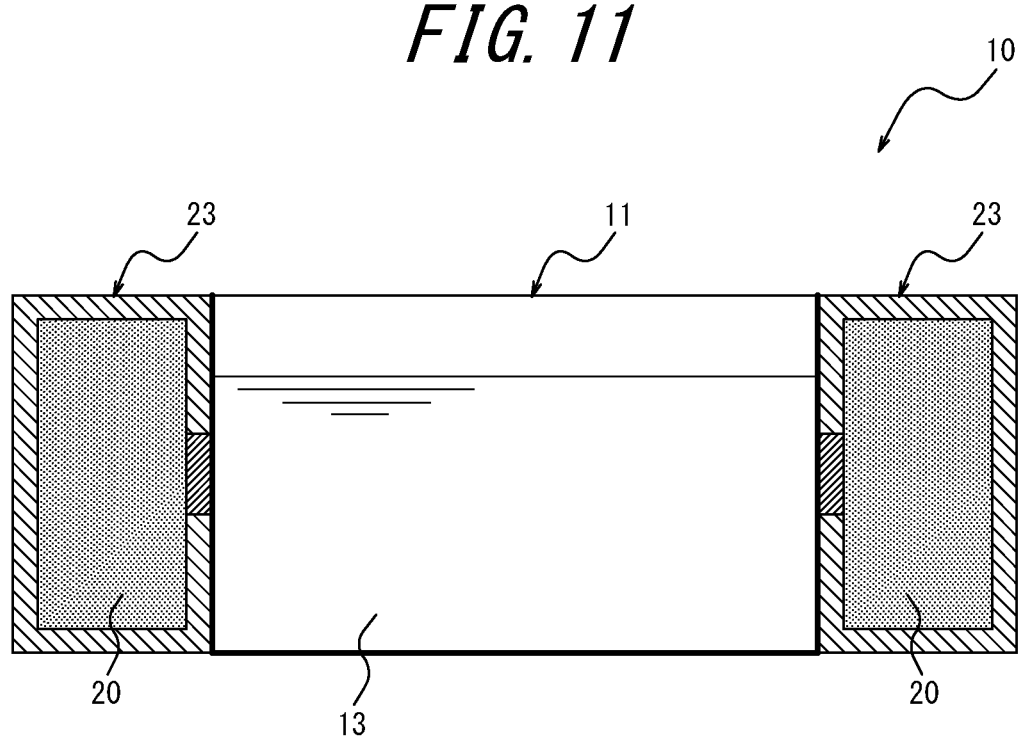
FIG. 11 is a diagram schematically illustrating an example of a component recovery container that includes a plurality of component recovery mechanisms.

FIG. 11 schematically illustrates another embodiment of the component recovery container 10. As illustrated in FIG. 11, the component recovery container 10 may include a plurality of component recovery mechanisms 23 for one target introduction unit 11. By the component recovery container 10 including a plurality of the component recovery mechanisms 23, recovery of the component for recovery by the plurality of component recovery mechanisms 23 can be controlled independently, enabling the recovery of the component for recovery to be controlled more freely.

When the component recovery container 10 includes a plurality of component recovery mechanisms 23 as illustrated in FIG. 11, the plurality of component recovery mechanisms 23 may recover different types of components for recovery. By the plurality of the component recovery mechanisms 23 recovering different types of components for recovery in this way, the recovery of different types of components for recovery can be controlled independently, which is useful when different types of components for recovery need to be recovered at independent timings.

Figure 12:
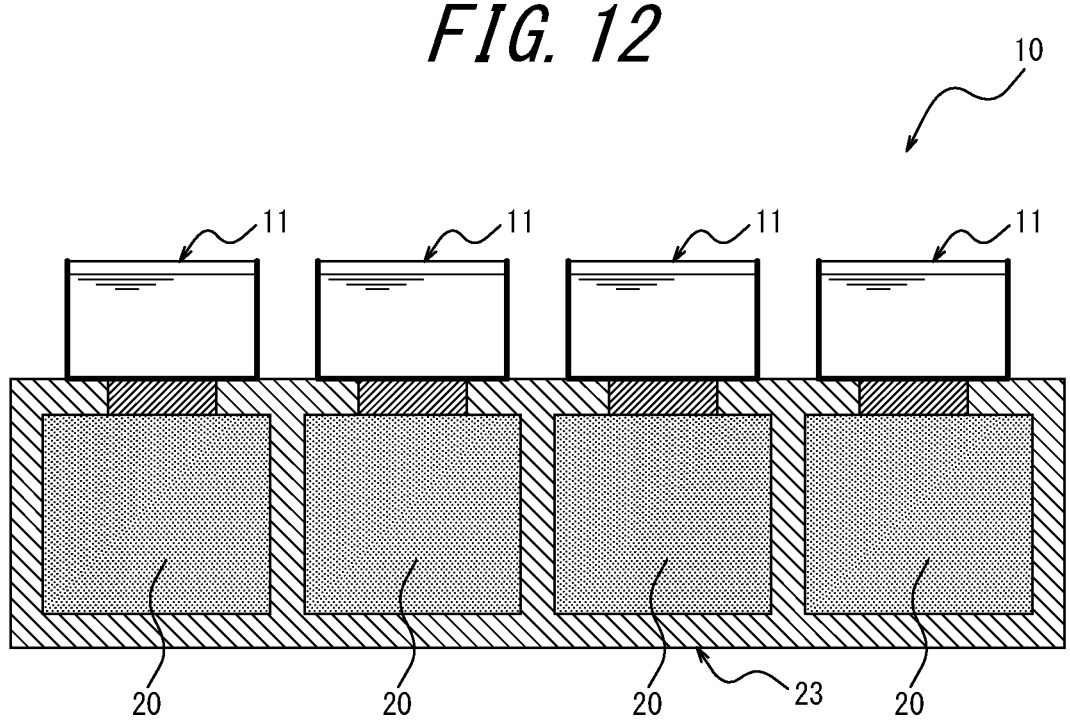
FIG. 12 is a diagram schematically illustrating an example of a component recovery container that includes a plurality of target introduction units and component recovery mechanisms.

FIG. 12 schematically illustrates a cross-section of another embodiment of the component recovery container 10. As illustrated in FIG. 12, the component recovery container 10 may include a plurality of target introduction units 11, and one or more (one in the illustrated example) component recovery mechanisms 23 may be provided for each target introduction unit 11. By one or more component recovery mechanisms 23 being provided for each component recovery container 10 in this way, the component for recovery can easily be recovered from a plurality of types of targets 13 in parallel.

Figure 13:
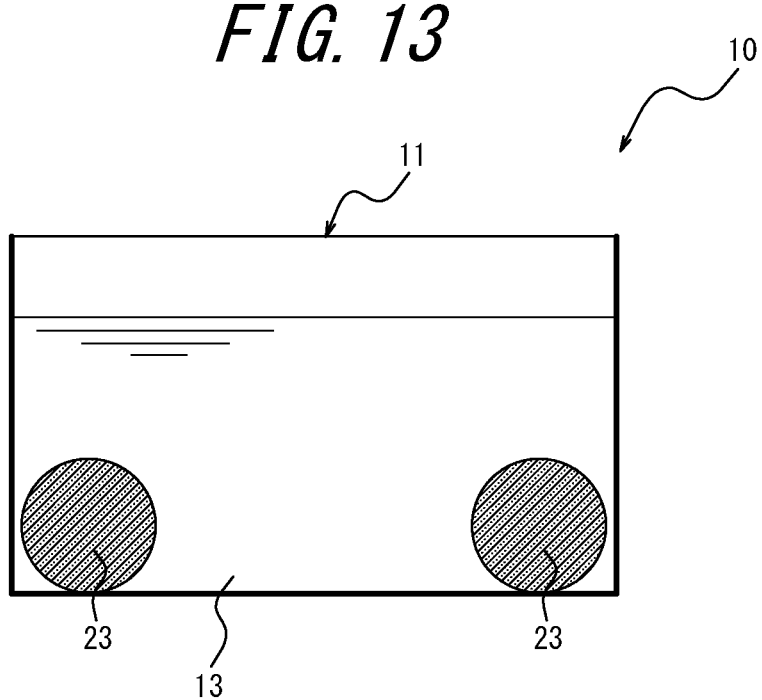
FIG. 13 is a diagram schematically illustrating an example of a component recovery container that includes a spherical component recovery mechanism.

FIG. 13 schematically illustrates a cross-section of another embodiment of the component recovery container 10. As illustrated in FIG. 13, the component recovery mechanism 23 may be disposed at a predetermined position inside the target introduction unit 11 without being fixed to the component recovery container 10. The component recovery mechanism 23 may be spherical, for example, and may be placed inside the target introduction unit 11 or caused to float. The component recovery mechanism 23 may be structured to have any of the forms illustrated in FIGS. 1A to 1C, with a spherical configuration. The number of component recovery mechanisms 23 and the type of component for recovery retained therein may be selected according to the purpose. When the component recovery mechanism 23 is disposed inside the target introduction unit 11 as necessary in this way without being fixed to the component recovery container 10, the component recovery container 10 can easily be configured according to the purpose.

Figure 14:
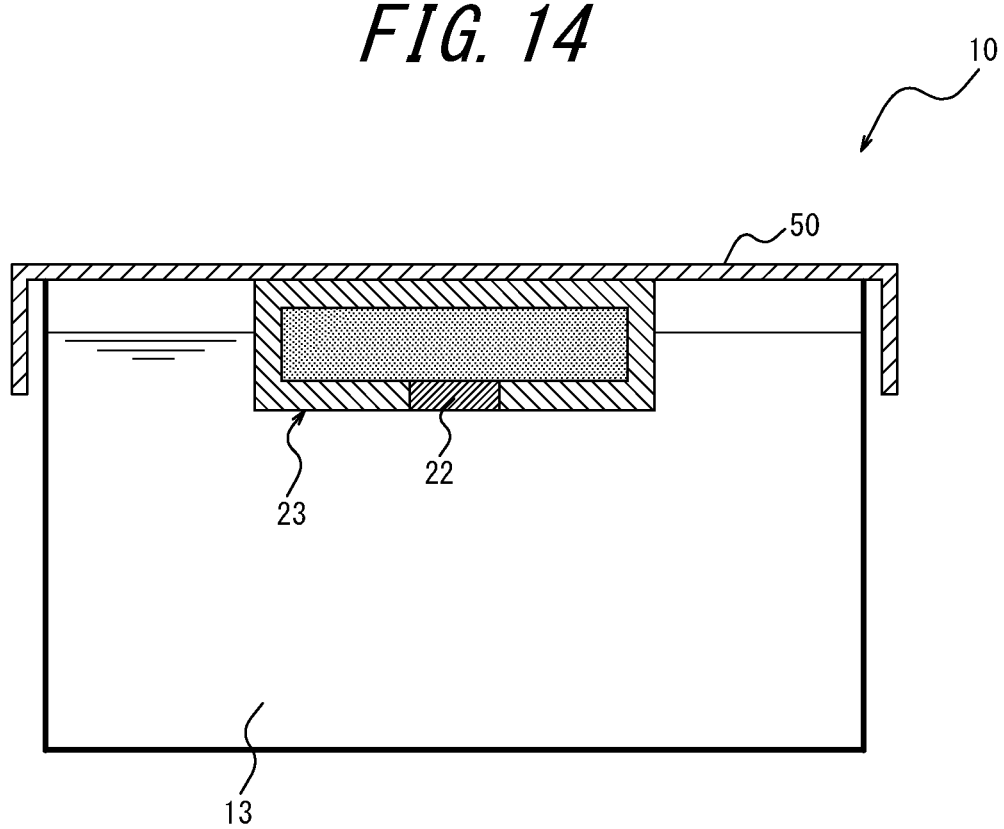
FIG. 14 is a diagram schematically illustrating an example of a component recovery container in which a component recovery mechanism is provided on the inside of a lid.

FIG. 14 schematically illustrates a cross-section of another embodiment of the component recovery container 10. As illustrated in FIG. 14, the component recovery mechanism 23 may be provided on the inner side of a lid 50 provided in the target introduction unit 11 (target introduction unit inner side). The culture medium 13 is introduced to be in contact with the diffusion adjustment unit 22. When the component recovery mechanism 23 is thus provided on the inner side of the lid 50, the component recovery container 10 can easily be configured according to the purpose. Furthermore, the present embodiment facilitates production of the component recovery container 10, since the component recovery container 10 can be configured by replacing the lid of a typical component recovery container with the lid 50 that has the component recovery mechanism 23 provided on the inner side thereof.

As described below, the component recovery container 10 can be a container for recovering the component for recovery while a culture target, such as cells, is cultured. The component recovery container 10 can also be a container for introducing a biological sample such as urine, blood, or saliva. In one embodiment, the component recovery container 10 can be a container capable of recovering the component for recovery at a predetermined timing from the target 13 while a biochemical reaction or a chemical reaction is performed.

The component recovery container 10 according to an embodiment may further include, in addition to the above-described component recovery mechanism 23, an additive diffusion mechanism that includes an additive retention unit configured to retain an additive to be added to the target 13, and an additive diffusion adjustment unit configured to adjust a diffusion rate of the additive from inside the additive retention unit to outside the additive retention unit. The target introduction unit 11 and the additive diffusion mechanism are connected via the additive diffusion adjustment unit. By the component recovery container thus further including the additive diffusion mechanism in addition to the component recovery mechanism, and the target introduction unit and the additive diffusion mechanism being connected via the additive diffusion adjustment unit, the addition of the additive to the target 13 and the recovery of the component for recovery from the target 13 can both be efficiently and easily controlled.

(Additive Diffusion Mechanism)

The additive diffusion mechanism for culturing disclosed in PCT/JP2019/001558 can be used as the additive diffusion mechanism. The additive diffusion mechanism includes an additive retention unit configured to retain an additive to be added to the target 13, and an additive diffusion adjustment unit configured to adjust the diffusion rate of the additive from inside the additive retention unit to outside the additive retention unit. Such provision of the diffusion adjustment unit that adjusts the diffusion rate of the additive from inside the additive retention unit to outside the additive retention unit enables proper adjustment of the amount of additive that diffuses outside the additive retention unit (to the target introduction unit) via the diffusion adjustment unit and proper adjustment of the timing of addition. This enables control of the addition of the additive to the target 13.

The specific form of the additive diffusion mechanism is not particularly limited, but in one example, the cross-section is as illustrated in FIGS. 1A and 1B, similar to the above-described component recovery mechanism 23. In other words, the entire periphery of the additive retention unit may be surrounded by the additive diffusion adjustment unit, as illustrated in FIG. 1B, or the periphery may be surrounded by an impermeable unit 41, which blocks diffusion or passage of an additive, and by the additive diffusion adjustment unit, as illustrated in FIG. 1A.

(Additive Retention Unit)

The additive retention unit retains an additive inside the additive retention unit so that additive does not diffuse outside the additive retention unit without passing through the additive diffusion adjustment unit. In the present disclosure, stating that the additive does not diffuse refers to a state in which diffusion of the additive is considered to be substantially zero. The additive retention unit may have any specific form. To cause the additive to diffuse gradually outside the additive retention unit via the additive diffusion adjustment unit, a porous material capable of enclosing the additive is preferably included in at least a portion of the additive retention unit. The additive retention unit is more preferably entirely formed from a porous material. The porous material may be a polymer gel, such as a chemical gel based on covalent bonds or a physical gel based on non-covalent intermolecular forces or the like, or may be a polymer gel in which covalent bonds and noncovalent intermolecular forces contribute to formation of the gel structure. Specifically, the following can be used as the porous material: hydrogels formed from sugar chains such as agarose, dextrin, pectin, sodium alginate, and xanthan gum; hydrogels formed from proteins such as collagen, hyaluronic acid, elastin, and gelatin; hydrogels formed from synthetic polymers such as polyacrylamide, polyethylene glycol, and silicone; and inorganic materials such as mesoporous carbon, mesoporous aluminosilicate, and mesoporous silica. A hydrogel is more preferably included in a portion of the additive retention unit, as doing so facilitates formation of pores roughly equivalent to various additives.

The above-described porous material may be appropriately modified by a functional group to increase the affinity for the retained additive. To prevent unwanted diffusion of the additive, the porous material may be modified by a functional group, and the functional group and the additive may be reacted to form a covalent or non-covalent bond, thereby fixing the additive on the porous material. The bond between the functional group and the additive is preferably a non-covalent bond for good diffusion of the additive. Examples of the functional group added to the porous material include hydrophilic groups such as a hydroxyl group, amino group, imino group, sulfone group, active ester group, and carboxyl group; and hydrophobic groups such as an alkyl group, phenyl group, and fluoroalkyl group.

A molecule capable of specifically recognizing and binding to an additive may be bound to the above-described porous material. For example, antibodies and aptamers that specifically bind to specific molecules such as proteins; single-stranded DNA that specifically binds to nucleic acids having a specific base sequence; lectins that specifically bind to sugar chains; and the like may be bound to the porous material. The porous material may also include a molecular imprint material that specifically recognizes an additive.

(Additive Diffusion Adjustment Unit)

The additive diffusion adjustment unit can have a similar configuration to that of the diffusion adjustment unit included in the component recovery mechanism. Since the details are as above, a description is omitted here.

(Impermeable Unit)

Like the above-described component recovery mechanism 23, the periphery of the additive retention unit may be surrounded by the impermeable unit 41, which blocks diffusion or passage of an additive, and by the additive diffusion adjustment unit (corresponding to the diffusion adjustment unit 22 of FIG. 1A), as illustrated in FIG. 1A. The impermeable unit 41 can have a similar configuration to that of the impermeable unit included in the component recovery mechanism. Since the details are as above, a description is omitted here.

Like the above-described recovery unit 20, the surface on the outer side of the additive retention unit may be covered with a different material from the material forming the additive retention unit. Like the above-described component recovery mechanism 23, the overall shape of the additive diffusion mechanism may be spherical. Since the details are as above, a description is omitted here.

(Additive)

The additive can be selected according to the purpose. Examples include low molecular weight compounds, nucleic acids, lipids, proteins, sugars, and amino acids. Proteins known to function as biological signals, such as differentiation-inducing factors, cell growth factors, antibodies, hormones, and chemokines, can be used as additives. Low molecular weight compounds that can be used as additives include inhibitors, antibiotics, and the like that bind to oxygen, receptors, and the like to impede the activity thereof. Such additives may be materials chemically synthesized artificially or may be materials obtained naturally. A surfactant may also be the additive. The additive may be vesicles, such as exosomes and liposomes, that include a plurality of components; biomaterial extracts; and cell secretions. The additive is not limited to a chemical substance and may be a virus.

Apart from the additive itself being retained in the additive retention unit, a cell-free protein synthesizing system may be enclosed in the additive retention unit, and proteins synthesized by the synthesizing system may be added as an additive. The cell-free protein synthesizing system may include translation components, such as ribosomes, tRNA, aminoacyl tRNA synthetases, translation initiation factors, translation elongation factors, and translation termination factors, and additionally amino acids, energy molecules such as ATP and GTP, salts such as magnesium ions, and templates such as DNA or mRNA. In the present embodiment, these can be used as additives when the protein has low stability or when the protein is difficult to isolate.

Microbes or animal cells may be enclosed in the additive retention unit, and secretions from the microbes or the animal cells may be added as an additive. In the present embodiment, these can be used as additives when the secretion has low stability or when the secretion is difficult to isolate. Furthermore, even when the component to be added is unknown, microbes or animal cells that secrete the component can be enclosed in the additive retention unit for suitable addition of the component as an additive.

The aforementioned additives can be added alone, or a plurality thereof can be added in combination. When a plurality of additives is added in combination, a plurality of additives may be retained in one additive retention unit, or a plurality of additive diffusion mechanisms may be provided for one component recovery container, and various types of additives may be retained in additive retention units of the plurality of additive diffusion mechanisms.

[Component Recovery Kit]

The present disclosure also provides a component recovery kit that includes the component recovery mechanism 23. When this component recovery kit is used, the component for recovery can easily be recovered from the target 13. Additionally, the component recovery kit includes at least one selected from the group of an instruction manual for the kit, a container for holding the target 13 and the component recovery mechanism, a dissolution solution for dissolving the recovery unit 20, and a buffer for extracting the component for recovery from the recovery unit 20. Instead of the instruction manual, the component recovery kit may include a document describing a method for downloading the instruction manual from a server.

[Component Recovery System]

Next, a component recovery system using the above-described component recovery container is described. The component recovery system according to the present disclosure is a system that enables efficient and easy control of the addition of the component for recovery from at least the target 13. As described below, in an embodiment, the component recovery system can be a system capable not only of recovering the component for recovery, but also of recovering the component for recovery from the target 13 at a predetermined timing while culturing, a biochemical reaction, or a chemical reaction is performed.

Figure 15:
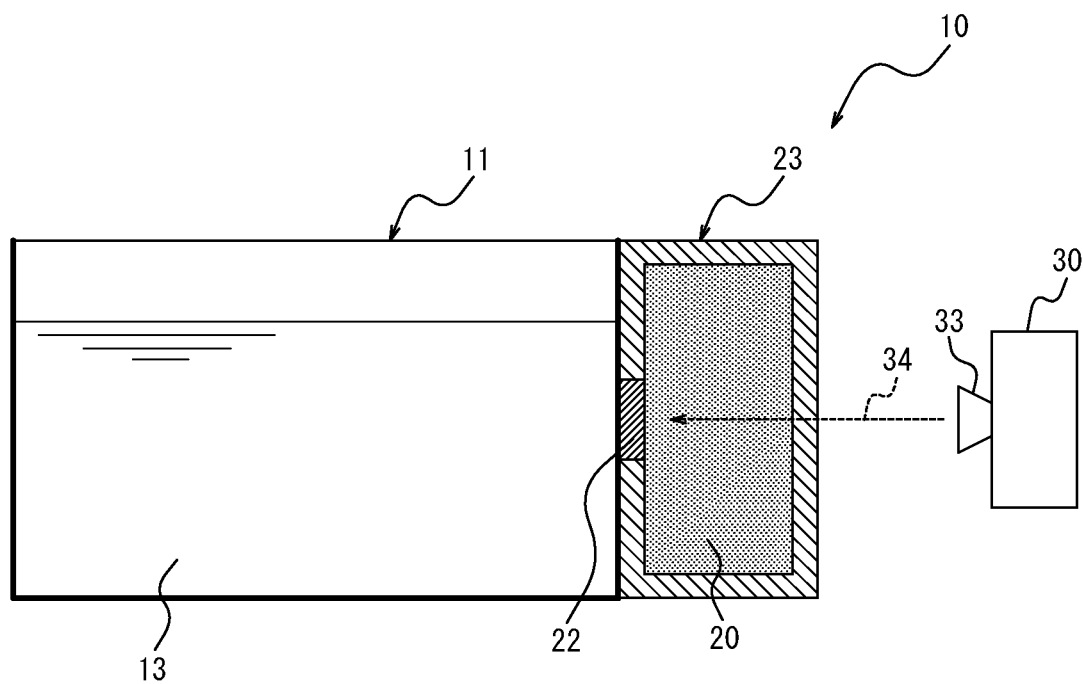
FIG. 15 is a diagram illustrating the schematic configuration of an example of a component recovery system.

FIG. 15 is a diagram illustrating the schematic configuration of an example of a component recovery system. As illustrated in FIG. 15, a component recovery system 100 includes the above-described component recovery container 10 and a recovery management apparatus 30. From FIG. 15 onwards, cross-sections of the component recovery container 10 are illustrated schematically. The component recovery container 10 includes the above-described component recovery mechanism 23 and the target introduction unit 11 for introducing the target 13. The component recovery mechanism 23 includes the recovery unit 20 for recovering the component for recovery and the diffusion adjustment unit 22 for adjusting the diffusion rate of the component for recovery from outside the recovery unit 20 to inside the recovery unit 20. The recovery management apparatus 30 includes a transmitter 33 that transmits a control signal 34.

[Configuration of Component Recovery System]

Figure 16:
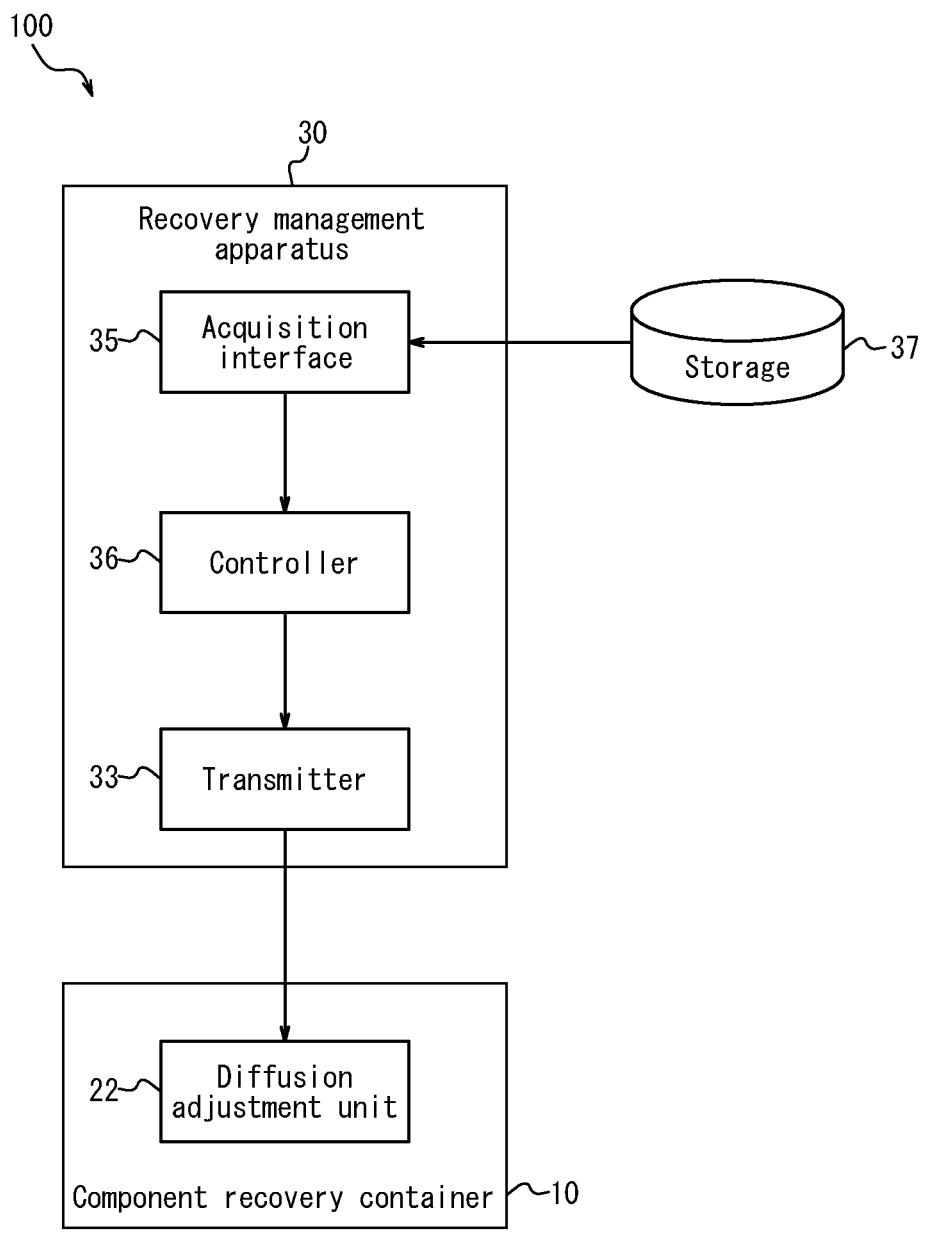
FIG. 16 is a functional block diagram illustrating an example of the basic structure of the component recovery system.

With reference to FIG. 16, the basic configuration of the component recovery system is described below. FIG. 16 is a functional block diagram illustrating an example of the basic structure of the component recovery system. As illustrated in FIG. 16, the recovery management apparatus 30 includes an acquisition interface 35, a controller 36, and the transmitter 33.

Figure 17:
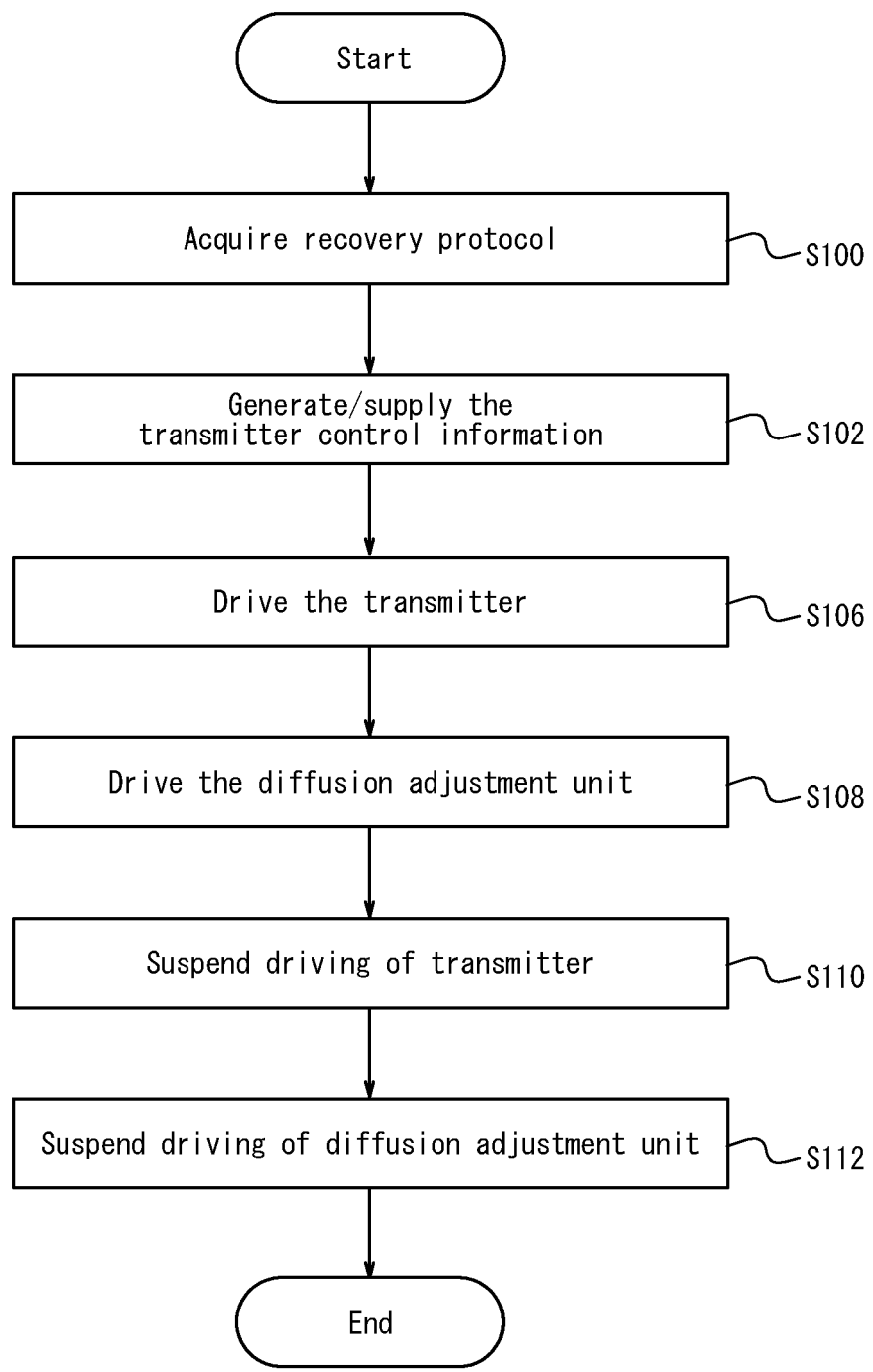
FIG. 17 is a flowchart illustrating an example of a method of adjusting the diffusion rate of a component for recovery in the component recovery system.

An overview of operations of the component recovery system 100 is provided with reference to the schematic configuration of FIG. 16 and the flowchart of FIG. 17. The acquisition interface 35 acquires a recovery protocol stored in a storage 37 and supplies the recovery protocol to the controller 36 (step S100). The controller 36 refers to the recovery protocol to generate transmitter control information for controlling transmission of the control signal 34 from the transmitter 33 and supplies the transmitter control information to the transmitter 33 (step S102). Based on the transmitter control information, the transmitter 33 transmits the control signal 34 for adjusting the diffusion rate of the component for recovery to the diffusion adjustment unit 22 of the component recovery container 10 (step S106). The diffusion adjustment unit 22 is driven (structurally changes) by receipt of the control signal 34 and changes the diffusion rate of the component for recovery from inside the recovery unit 20 to outside the recovery unit 20 via the diffusion adjustment unit 22 (step S108). Based on the transmitter control information, the transmitter 33 suspends transmission of the control signal 34 (step S110). Upon suspension of the transmission of the control signal 34 from the transmitter 33, the diffusion adjustment unit 22 stops being driven (changes to the state before receipt of the control signal 34), and the diffusion rate of the component for recovery from inside the recovery unit 20 to outside the recovery unit 20 via the diffusion adjustment unit 22 returns to its original state (step S112). By adjustment of the diffusion rate of the component for recovery from outside the recovery unit 20 to inside the recovery unit 20 in this way, the amount of the component for recovery flowing into the recovery unit 20 by diffusion and the timing of recovery can be properly controlled.

Next, the components of the above-described component recovery system 100 are described in detail.

The storage 37 may be a non-volatile memory or storage medium that can be written to and read from at any time, such as a solid state drive (SSD), a hard disk drive (HDD), an optical disc, or the like. The storage 37 may be provided inside the recovery management apparatus 30. The storage 37 may be provided on a computer connected over a network.

The recovery management apparatus 30 includes a central processing unit (CPU) and a program memory, which constitute a computer, and includes the above-described controller 36 and acquisition interface 35 as the parts that perform the control necessary for implementing the present embodiment. These parts are each implemented by the CPU executing programs stored in the program memory.

The transmitter 33 transmits an optical signal, an electric signal, an acoustic signal, a magnetic signal, or the like as the control signal 34. To increase the degree of freedom of control, a signal that can be operated wirelessly, in a non-contact manner, or remotely is preferably used as the control signal 34. In one example, the transmitter 33 transmits a control signal 34 of a specific type, intensity, and transmission time based on the transmitter control information. When an optical signal, such as near-infrared rays, is used as the control signal 34, the transmitter 33 in an example transmits a control signal 34 of a specific wavelength based on the transmitter control information.

The transmitter 33 may transmit the control signal 34 through the recovery unit 20 to the diffusion adjustment unit 22, as illustrated in FIG. 15, or may transmit the control signal 34 to the diffusion adjustment unit 22 without the control signal 34 passing through the recovery unit 20.

The recovery management apparatus 30 may include a transport apparatus for moving the transmitter 33 inside the component recovery system 100. A configuration to move the transmitter 33 inside the component recovery system 100 enables movement of the transmitter 33 as necessary to a position appropriate for transmitting the control signal 34, thus enabling suitable transmission of the control signal 34 even when a plurality of the diffusion adjustment units 22 is provided, as described below.

Figure 18:
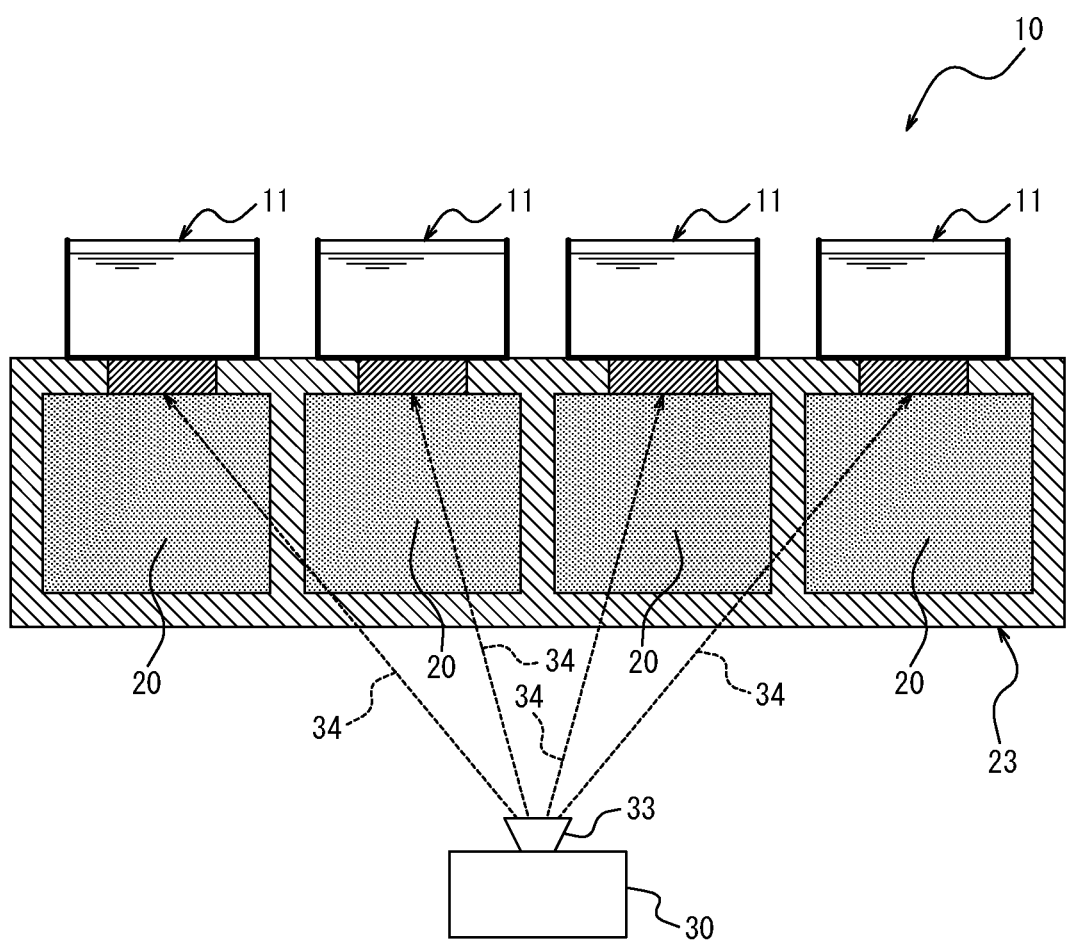
FIG. 18 is a diagram illustrating the schematic configuration of an example of a component recovery system that includes a plurality of target introduction units and component recovery mechanisms.

Any of the above-described component recovery containers 10 may be used in the present component recovery system. For example, as illustrated in FIG. 11, in an embodiment using a component recovery container 10 that includes a plurality of component recovery mechanisms 23 for one target introduction unit 11, the controller 36 may refer to the recovery protocol to generate transmitter control information for transmitting the control signal 34 to a predetermined diffusion adjustment unit 22 among the plurality of diffusion adjustment units 22. The transmitter 33 may then transmit, to the predetermined diffusion adjustment unit 22, the control signal 34 for adjusting the diffusion rate of the component for recovery based on the transmitter control information corresponding to the predetermined diffusion adjustment unit 22. The predetermined diffusion adjustment unit 22 may then adjust the diffusion rate of the component for recovery to the target introduction unit 11 based on the control signal 34. According to this configuration, recovery of the component for recovery from the plurality of component recovery mechanisms 23 can be controlled independently, enabling the recovery of the component for recovery from the target introduction unit 11 to be controlled more freely. Furthermore, even when the same type of component for recovery is diffused to the recovery units 20 of a plurality of diffusion adjustment units 22, the diffusion of the component for recovery to the plurality of recovery units 20 can be controlled independently, enabling suitable adjustment of the concentration gradient of the component for recovery in the target introduction unit 11. Control signals differing from each other in wavelength, irradiation duration, irradiation intensity, irradiation position (position of the transmitter 33 when transmitting the control signal 34), irradiation range, and the like can be used as the control signals for the diffusion adjustment units 22.

In an embodiment using a component recovery container 10 that includes a plurality of target introduction units 11 and a plurality of component recovery mechanisms 23 for the plurality of target introduction units 11, as illustrated in FIG. 18, the controller 36 may refer to the recovery protocol to generate transmitter control information for transmitting the control signal 34 to the plurality of diffusion adjustment units 22 included in the plurality of component recovery mechanisms 23. The transmitter 33 may then transmit, to the plurality of diffusion adjustment units, the control signal 34 for adjusting the diffusion rate of the component for recovery based on the transmitter control information. The diffusion adjustment units may then adjust the diffusion rate of the component for recovery to the plurality of target introduction units 11 based on the control signal 34. FIG. 18 illustrates an example of the transmitter 33 transmitting the control signal 34 to the diffusion adjustment units 22 from one location, but the transmitter 33 may include a transport apparatus and transmit the control signal 34 to each diffusion adjustment unit 22 while moving. According to such a component recovery system, the recovery of the component for recovery from the plurality of target introduction units 11 to the culture medium 13 can be controlled in parallel efficiently and easily.

In an embodiment using the component recovery container 10 illustrated in FIG. 18, the controller 36 may refer to the recovery protocol to generate transmitter control information for transmitting the control signal 34 to a predetermined diffusion adjustment unit 22 among the plurality of diffusion adjustment units 22 included in the plurality of component recovery mechanisms 23. The transmitter 33 may then transmit, to each predetermined diffusion adjustment unit 22, the control signal 34 for adjusting the diffusion rate of the component for recovery based on the transmitter control information corresponding to the predetermined diffusion adjustment unit 22. The diffusion adjustment unit 22 may then adjust the diffusion rate of the component for recovery from the predetermined diffusion adjustment unit 22 to the target introduction unit 11 based on the control signal 34. According to this configuration, recovery of the component for recovery from the plurality of target introduction units 11 to the culture medium 13 can be controlled independently. The target 13 can thereby be recovered in parallel under a variety of conditions, so that suitable conditions for performing recovery can be studied and selected efficiently.

Figure 19:
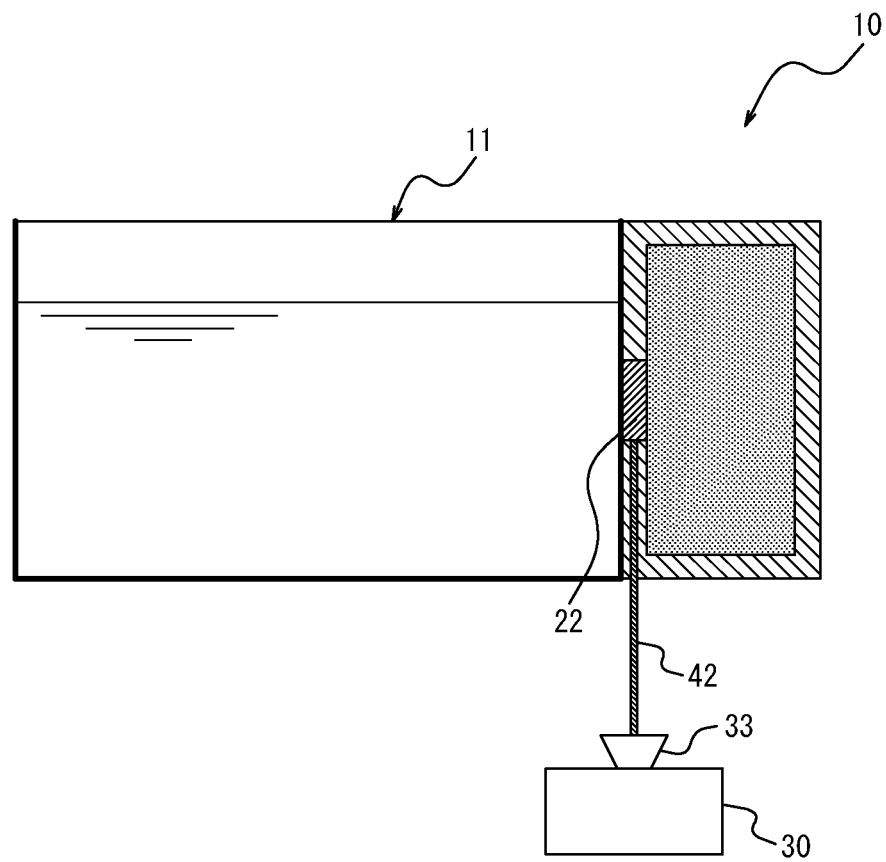
FIG. 19 is a diagram illustrating the schematic configuration of an example of a component recovery system that includes a signal transmission path.

As illustrated in FIG. 19, a signal transmission path 42 for transmitting the control signal 34 to the diffusion adjustment unit 22 may be connected to the transmitter 33. When the signal transmission path 42 for transmitting the control signal 34 to the diffusion adjustment unit 22 is connected to the transmitter 33 in this way, the control signal 34 is not blocked or disrupted by external factors, thereby enabling the control signal 34 to be transmitted to the diffusion adjustment unit 22 more accurately.

One end of the signal transmission path 42 is connected to the transmitter 33 and the other end is connected to the diffusion adjustment unit 22 in the example in FIG. 19, but the other end need not be connected to the diffusion adjustment unit 22. In an example, the other end of the signal transmission path 42 connected to the transmitter 33 is installed to a point near the diffusion adjustment unit 22. Installing the other end of the signal transmission path 42 to a point near the diffusion adjustment unit 22 without connecting the signal transmission path 42 to the diffusion adjustment unit 22 can prevent blockage, disruption, or the like of the control signal 34 as compared to when the signal transmission path 42 is not included.

In an example, the other end of the signal transmission path 42 is not connected to the diffusion adjustment unit 22 but rather installed up to a point outside the component recovery container 10. Installing the other end of the signal transmission path 42 up to a point outside the component recovery container 10 without connection to the diffusion adjustment unit 22 enables separation of the component recovery container 10 and the signal transmission path 42 while preventing blockage, disruption, or the like of the control signal 34 by the signal transmission path 42. This facilitates replacement of the component recovery container 10. Hence, when the signal transmission path 42 is provided for a disposable component recovery container 10, the other end of the signal transmission path 42 is preferably installed up to the outside of the component recovery container 10 without being connected to the diffusion adjustment unit 22. In an embodiment for transporting the component recovery container 10, as described below, transportation of the component recovery container 10 could be obstructed if the other end of the signal transmission path 42 is connected to the diffusion adjustment unit 22. Hence, when the signal transmission path 42 is provided in an embodiment for transporting the component recovery container 10, the other end of the signal transmission path 42 is preferably installed up to the outside of the component recovery container 10 without being connected to the diffusion adjustment unit 22.

The type of signal transmission path 42 can be appropriately selected in accordance with the type of control signal 34. For example, when an electric signal is used as the control signal 34, a conducting wire can be used as the signal transmission path 42, whereas when the control signal 34 is an optical signal, an optical waveguide such as an optical fiber can be used.

The recovery protocol defines at least a procedure to recover the component for recovery. In an example, the recovery protocol defines at least one piece of information (A) selected from among the group consisting of a recovery amount of the component for recovery, a recovery duration (length of time of recovery), and a timing. The timing of recovery refers to the timing at which recovery of the component for recovery starts and ends. The acquisition interface 35 acquires the information (A) and supplies the information (A) to the controller 36. The controller 36 refers to the information (A) to generate transmitter control information that includes at least one piece of information (B) selected from among the group consisting of the intensity of the control signal 34 generated by the transmitter 33, the driving duration (the length of time of driving) of the transmitter 33, and the timing of driving, and supplies the transmitter control information to the transmitter 33. The transmitter 33 refers to the information (B) and transmits the control signal 34 to the diffusion adjustment unit 22 at a predetermined intensity, duration (length of time), and timing. The diffusion adjustment unit 22 receives the control signal 34 and recovers a predetermined amount of the component for recovery from the target 13 for the predetermined duration (length of time) at the predetermined timing. By the recovery protocol thus defining at least one piece of information selected from among the group consisting of a recovery amount of the component for recovery, a recovery duration, and a timing, the component recovery system can acquire the recovery protocol and adjust at least one selected from among the group consisting of the recovery amount of the component for recovery, the recovery duration, and the timing.

As illustrated in FIG. 11, when the component recovery container 10 includes a plurality of component recovery mechanisms 23, and the types of components for recovery recovered by the plurality of component recovery mechanisms 23 differ from each other, the recovery protocol can define the type of component for recovery to be recovered (information (C)). In this case, the acquisition interface 35 acquires the information on the type of component for recovery to be recovered and supplies the information to the controller 36. The acquisition interface 35 further acquires information (information (D)) associating the position of the plurality of component recovery mechanisms 23 and the type of component for recovery suitably recovered by each component recovery mechanism 23 and supplies the information (D) to the controller 36. In an example, the information (D) is defined in advance, in accordance with the type of component recovery container 10 in use, and is stored in the storage 37. The controller 36 refers to the information (C) and (D) to generate transmitter control information including information on the component recovery mechanism 23 to which the control signal 34 is to be transmitted. The controller 36 then supplies the transmitter control information to the transmitter 33. The transmitter 33 refers to the transmitter control information and transmits the control signal 34 to the diffusion adjustment unit 22 of the component recovery mechanism 23 that retains a predetermined type of component for recovery. The predetermined diffusion adjustment unit 22 receives the control signal 34 and recovers the predetermined component for recovery from the target 13.

When the component recovery system acquires the state of the target 13 (amount of reaction product in the target 13, or the differentiation stage, growth stage, and the like of the culture target in the culture medium when the target 13 is a culture medium) using a target state measurement unit or the like as described below, the recovery protocol may define the timing of the recovery of the component for recovery according to the amount of reaction product in the target 13 or the differentiation stage and the growth stage of the target 13 in the target 13. That is, the recovery protocol may define the start and end of recovery by the amount of reaction product in the target 13 or at a specific differentiation stage and growth stage of the target 13. In an example, the component recovery container 10 includes a plurality of component recovery mechanisms 23, the types of the components for recovery recovered by the plurality of component recovery mechanisms 23 differ, and according to the amount of reaction product in the target 13 or the differentiation stage and the growth stage of the culture target, the recovery protocol specifies the type of component for recovery to be recovered, the recovery amount, and the recovery time in association with the amount of reaction product in the target 13 or each differentiation stage and growth stage of the target 13.

Figure 20:
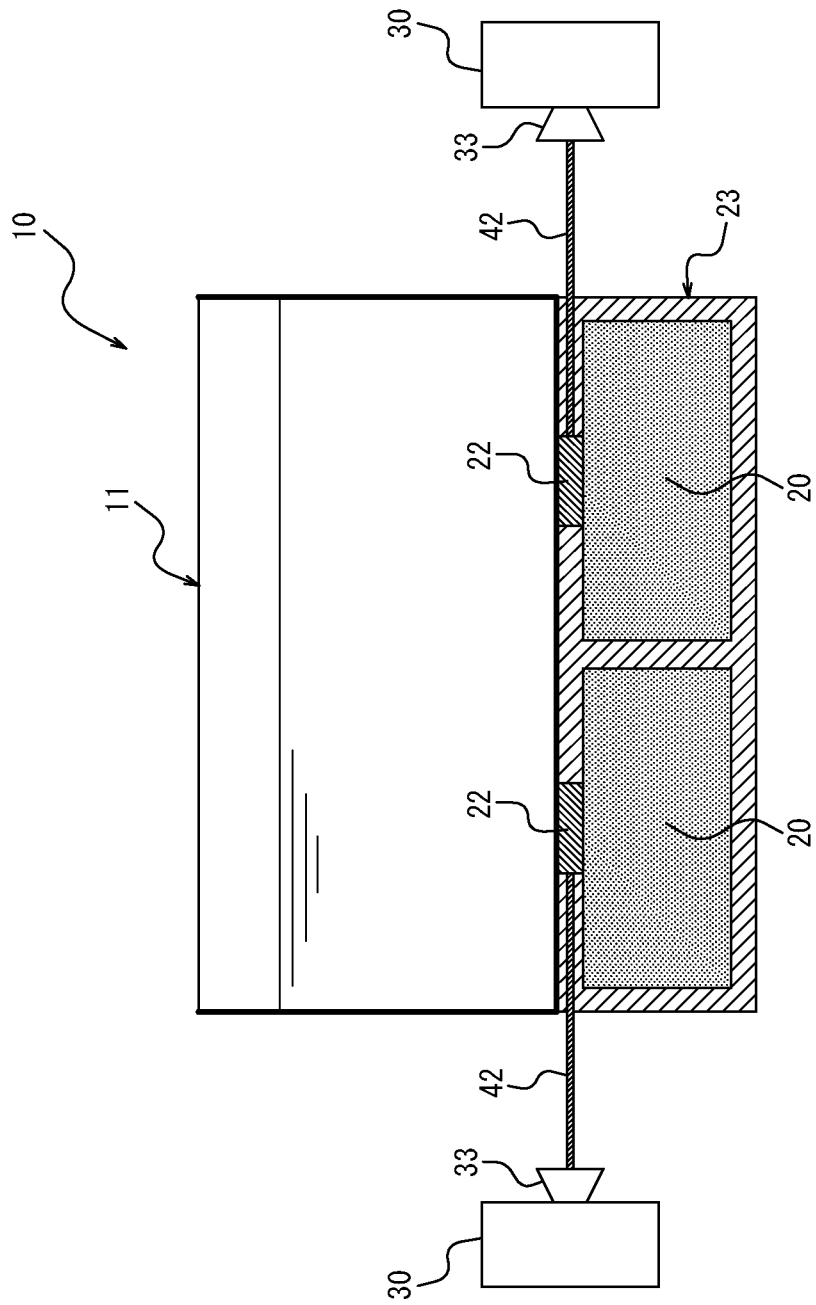
FIG. 20 is a diagram illustrating the schematic configuration of an example of a component recovery system using a component recovery container that includes a plurality of component recovery mechanisms.

FIG. 20 schematically illustrates another embodiment of the component recovery system. As illustrated in FIG. 20, the component recovery container 10 may include a plurality of component recovery mechanisms 23, and a signal transmission path 42 for transmitting a control signal 34 to the diffusion adjustment unit 22 of each component recovery mechanism 23 may be connected to a transmitter 33. Transmission of the control signals 34 via the signal transmission paths 42 in this way can prevent crosstalk between control signals 34 for a plurality of diffusion adjustment units 22. Accordingly, even when the diffusion adjustment units 22 are positioned near each other as illustrated in FIG. 20, the control signal 34 can be prevented from being transmitted to a nearby diffusion adjustment unit 22, thereby enabling the diffusion adjustment units 22 to be controlled independently. FIG. 20 illustrates an embodiment in which a different transmitter 33 is connected to each signal transmission path 42. Alternatively, a plurality of signal transmission paths 42 may be provided for one transmitter 33, and the signal transmission paths 42 for diffusion adjustment units 22 to which the control signal 34 is not to be transmitted may be blocked using a shutter, mask, or the like so that the transmitter 33 can transmit the control signal 34 to a specific diffusion adjustment unit 22.

Figure 21:
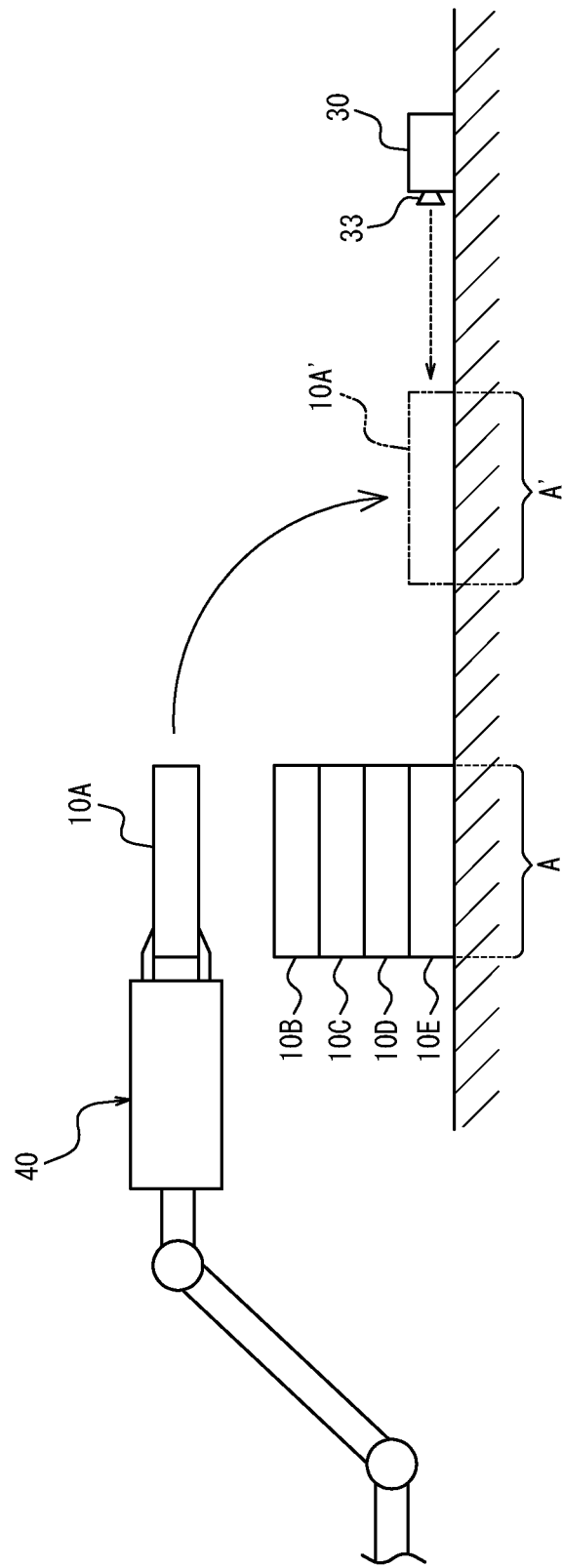
FIG. 21 is a diagram illustrating the schematic configuration of an example of a component recovery system that includes a transport unit.

FIG. 21 schematically illustrates another embodiment of the component recovery system. As illustrated in FIG. 21, the component recovery system may include a plurality of component recovery containers 10 and further include a transport unit 40 configured to move at least one of the component recovery containers 10 from position A to a predetermined position. In the example in FIG. 21, the transport unit 40 transports one component recovery container 10A among the plurality of component recovery containers 10 to a predetermined position A. For the sake of illustration, the component recovery container 10A that is moved to position A' is referred to as component recovery container 10A'. The controller 36 creates transmitter control information a, b, c, d respectively for the plurality of component recovery containers 10A, 10B, 10C, 10D. The transmitter 33 transmits the control signal 34 to the diffusion adjustment unit 22 of the component recovery container 10A' based on the transmitter control information a corresponding to the component recovery container 10A' moved to the predetermined position. This configuration to move the component recovery container 10 to a predetermined position and transmit the control signal 34 to the component recovery container 10 moved to the predetermined position enables efficient recovery of a large amount automatically. After the control signal 34 is transmitted, the component recovery container 10 is returned to the original position (A) by the transport unit 40.

The transport unit 40 may have any specific form, such as an automatic robot hand, as illustrated in FIG. 21, or a belt conveyor.

Figure 22:
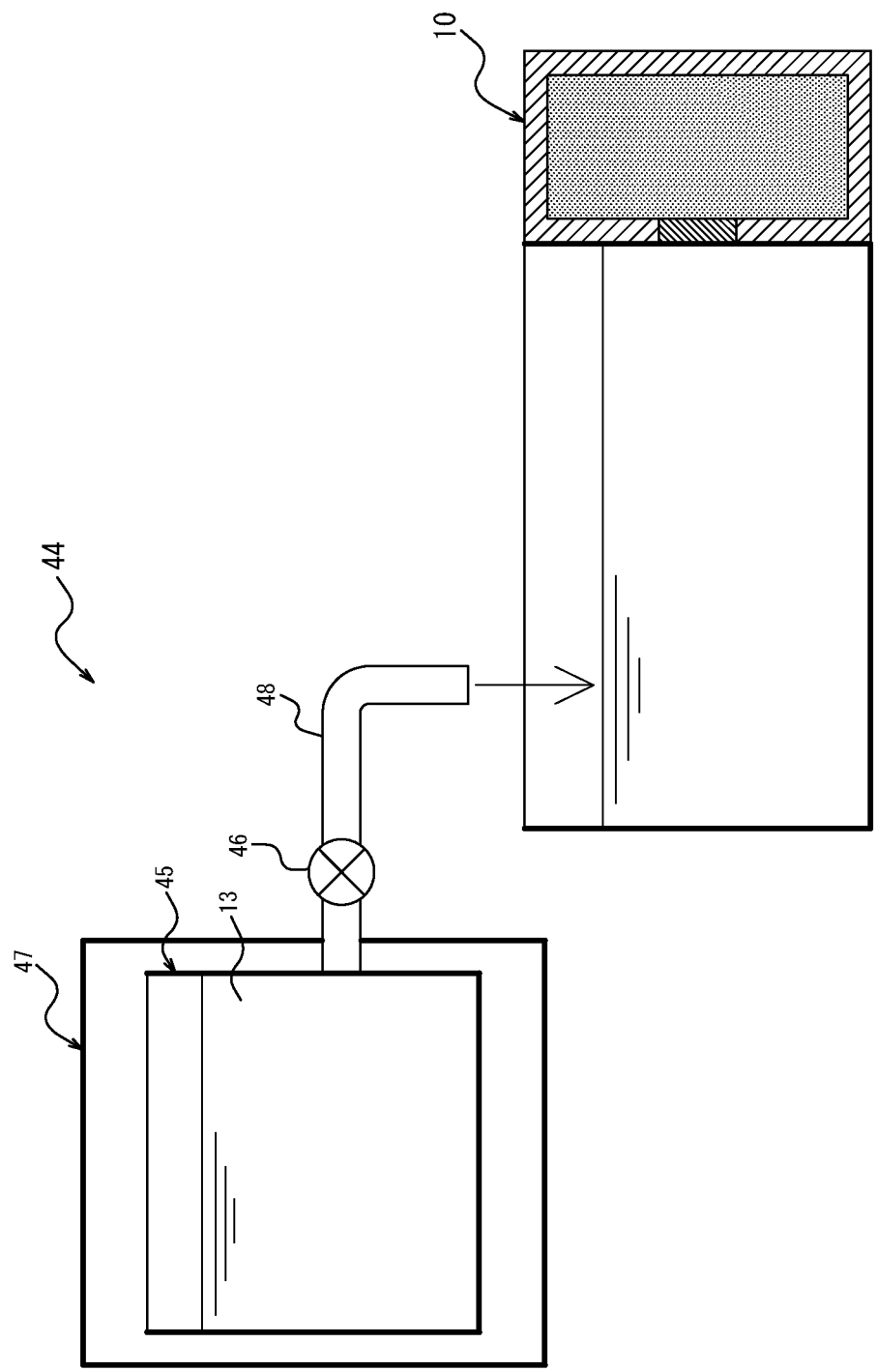
FIG. 22 is a diagram illustrating the schematic configuration of an example of a component recovery system including a target supply unit that introduces a target into a target introduction unit.

As illustrated in FIG. 22, the component recovery system may further include a target supply unit 44 that introduces the target 13 into the target introduction unit 11. The target supply unit 44 includes a target storage unit 45 for storing the target 13, a target preservation unit 47 for suitably storing the target 13, a target transfer route 48 for supplying the target 13 to the target introduction unit 11, and a target transfer unit 46 driven to supply the target 13 via the target transfer route 48. In the example in FIG. 22, the target 13 is further included. By the target supply unit 44 supplying the target 13 to the target introduction unit 11 based on the target supply unit control information in this way, the supply of the target 13 can also be automated, thus enabling more efficient recovery of the component for recovery. In particular, it takes time and effort to supply the target 13 manually when the component recovery container 10 includes a plurality of target introduction units 11 as illustrated in FIG. 10, or when a plurality of component recovery containers 10 is used. Automating the supply of the target 13 as in the present embodiment enables the target 13 to be introduced efficiently into the target introduction unit 11.

Embodiments of the target storage unit 45 are not particularly limited, and containers or the like typically used to store the target 13 can be used.

The target preservation unit 47 may include a mechanism for cooling and freezing to prevent degradation of the components in the target 13. The target preservation unit 47 may store the target 13 in a dry solid state and add an appropriate solvent to the target 13 in the dry solid state when necessary.

As long as the target transfer unit 46 can supply the necessary volume of the target 13 to the target introduction unit 11, the target transfer unit 46 may, for example, be a dispenser, an inkjet, a pump, or the like.

The target transfer route 48 can be a typical silicon tube, pipe, or the like.

While not illustrated, the component recovery system may further include a target disposal unit to dispose of the target 13 that is no longer necessary from the target introduction unit 11.

Figure 23:
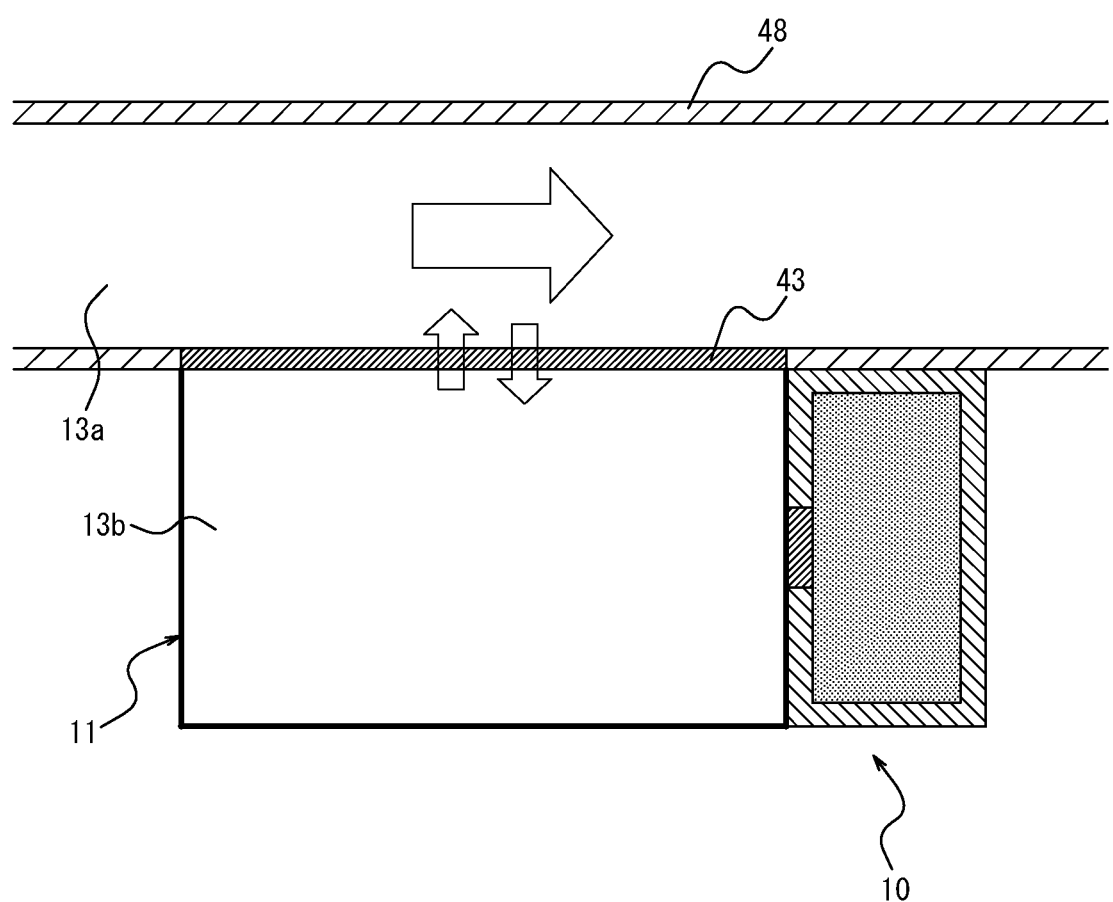
FIG. 23 is a diagram illustrating the schematic configuration of an example of a component recovery system that includes a semi-permeable membrane unit formed by a semi-permeable membrane.

In an embodiment in which the component recovery system includes the target supply unit 44, at least a portion of the component recovery container 10 may be a semi-permeable membrane unit 43 formed by a semi-permeable membrane, as illustrated in FIG. 23. The target storage unit 45, the target preservation unit 47, and the target transfer unit 46 are not illustrated in FIG. 23. In the example in FIG. 23, the target transfer route 48 is provided at the upper portion of the semi-permeable membrane unit 43, and the target 13a flows back in the direction of the arrow through the target transfer route 48. A fluid connection is formed via the semi-permeable membrane unit 43 between the target 13b filling the target introduction unit 11 and the target 13a flowing back through the target transfer route 48. By culturing, chemical reaction, biochemical reaction, or the like, the concentration of each component of the target 13b in the target introduction unit 11 becomes different from that of the target 13a that flows back through the target transfer route 48. This difference in concentration leads to an exchange of components, via the semi-permeable membrane unit 43, between the target 13a supplied from the target supply unit 44 and the target 13b inside the component recovery container 10. Macromolecules that cannot pass through the semi-permeable membrane unit 43 are retained within the target introduction unit 11. Through component exchange, unnecessary components in the target 13b move to the target 13a, and conversely, necessary components move from the target 13a to the target 13b.

The semi-permeable membrane forming the semi-permeable membrane unit 43 can be selected in accordance with the type of target. The semi-permeable membrane can be a porous membrane such as regenerated cellulose (cellophane), acetyl cellulose, polyacrylonitrile, Teflon® (Teflon is a registered trademark in Japan, other countries, or both), a polyester-based polymer alloy, polysulfone, and the like.

The component recovery system may further include a target state measurement unit that measures the state of the target 13 in the target introduction unit 11. The acquisition interface 35 acquires the measurement result of the state of the target by the target state measurement unit and supplies the measurement result to the controller 36. In addition to the above-described recovery protocol, the controller 36 also refers to the measurement result of the state of the target to determine the state of the target 13, calculate the recovery procedure of the component for recovery according to the state of the target 13, and generate transmitter control information. By the transmitter control information being generated with reference to the measurement result of the state of the target 13 in this way, the component for recovery can be recovered suitably according to the state of the target 13.

A measurement apparatus appropriate for the target 13 is selected as the target state measurement unit. A measurement method that is not very invasive for the target 13 and the component for recovery, and that does not adversely affect recovery control of the component for recovery, is preferably used with the target state measurement unit. The target state measurement unit may, for example, measure the state of the target 13 by introducing a measurement reagent into the target introduction unit 11. The state of the target 13 may also be measured by sampling the target 13 from the target introduction unit 11 and analyzing the sample with an analysis device. Various other measurement methods can be used in the culture target state measurement unit to measure the state of the target 13, such as fluorometry, Raman spectroscopy, infrared spectroscopy, ultrasonography, or the like, in accordance with the target 13 and the purpose of recovery. These measurement methods may be used alone, or a plurality thereof may be used in combination.

The specific configuration of the classification and learning process for the controller 36 to determine the state of the target 13 is not restricted. The following machine learning methods, for example, may be used alone or in combination.

Support vector machine (SVM)
Clustering
Inductive Logic Programming (ILP)
Genetic Programming (GP)
Bayesian Network (BN)
Neural Network (NN)

In the case of using a neural network, the data used is preferably processed in advance for input to the neural network. Such processing may use a method such as data argumentation in addition to organizing the data in a one-dimensional array or a multi-dimensional array.

In the case of using a neural network, a convolutional neural network (CNN) that includes convolution processing may be used. In greater detail, a convolution layer that performs convolution calculation may be provided as one or more layers included in a neural network, and a filter operation (product-sum operation) may be performed on the input data to be inputted to the layer. When the filter operation is performed, processing such as padding may also be performed, or an appropriately set stride width may be adopted.

A multilayer or ultra-multilayer neural network with several tens to several thousands of layers may be used as the neural network.

The machine learning used for determination processing of the state of the target 13 by the controller 36 may be supervised learning or unsupervised learning.

In this way, the controller 36 in an example includes a machine learning mechanism and can refer to the learning result of the machine learning mechanism to determine the state of the target 13. This configuration enables the controller 36 to execute processing to determine the state of the target 13 accurately.

The component recovery system may further include a component for recovery measurement unit that measures the concentration of the component for recovery included in the target 13 inside the target introduction unit 11. As the concentration of the component for recovery, the component for recovery measurement unit can measure the average concentration of the component for recovery in the target introduction unit 11, and can also measure a local concentration of the component for recovery in the target introduction unit 11, a concentration distribution in the target introduction unit 11, and the like. The acquisition interface 35 acquires the measurement result of the concentration of the component for recovery by the component for recovery measurement unit and supplies the measurement result to the controller 36. The controller 36 further refers to the measurement result of the concentration of the component for recovery in addition to the above-described recovery protocol to generate s the transmitter control information. By the transmitter control information thus being generated with reference to the measurement result of the concentration of the component for recovery, the recovery can be performed while the concentration of the component for recovery is monitored. An appropriate amount of the component for recovery can thereby be recovered.

The type of component for recovery measurement unit may be selected appropriately in accordance with the type of component for recovery. For example, the component for recovery measurement unit may include a sampling apparatus and a measuring device for high-speed liquid chromatography, mass spectrometry, or the like, and the target 13 in the target introduction unit 11 sampled by the sampling apparatus may be measured by the measuring device. The component for recovery measurement unit may measure the concentration of the component for recovery using a method that does not require sampling, such as spectroscopic analysis. Measurement of the component for recovery may be facilitated by use of a component for recovery labeled with fluorescent molecules or the like.

The component recovery system may include a target environment maintenance unit for maintaining a physical parameter inside the target introduction unit 11 within a certain range. By a physical parameter inside the target introduction unit 11 being maintained within a certain range, the environment in the target 13 can be suitably maintained. Recovery can thereby be performed efficiently even when the target is sensitive to changes in the physical parameter.

Examples of the physical parameters maintained within a certain range by the target environment maintenance unit include temperature, humidity, partial pressure of gasses such as oxygen and carbon dioxide, and atmospheric pressure. The target environment maintenance unit can be selected appropriately in accordance with the physical parameter for the target 13. Examples include a thermostat and a multi-gas incubator.

Figure 24:
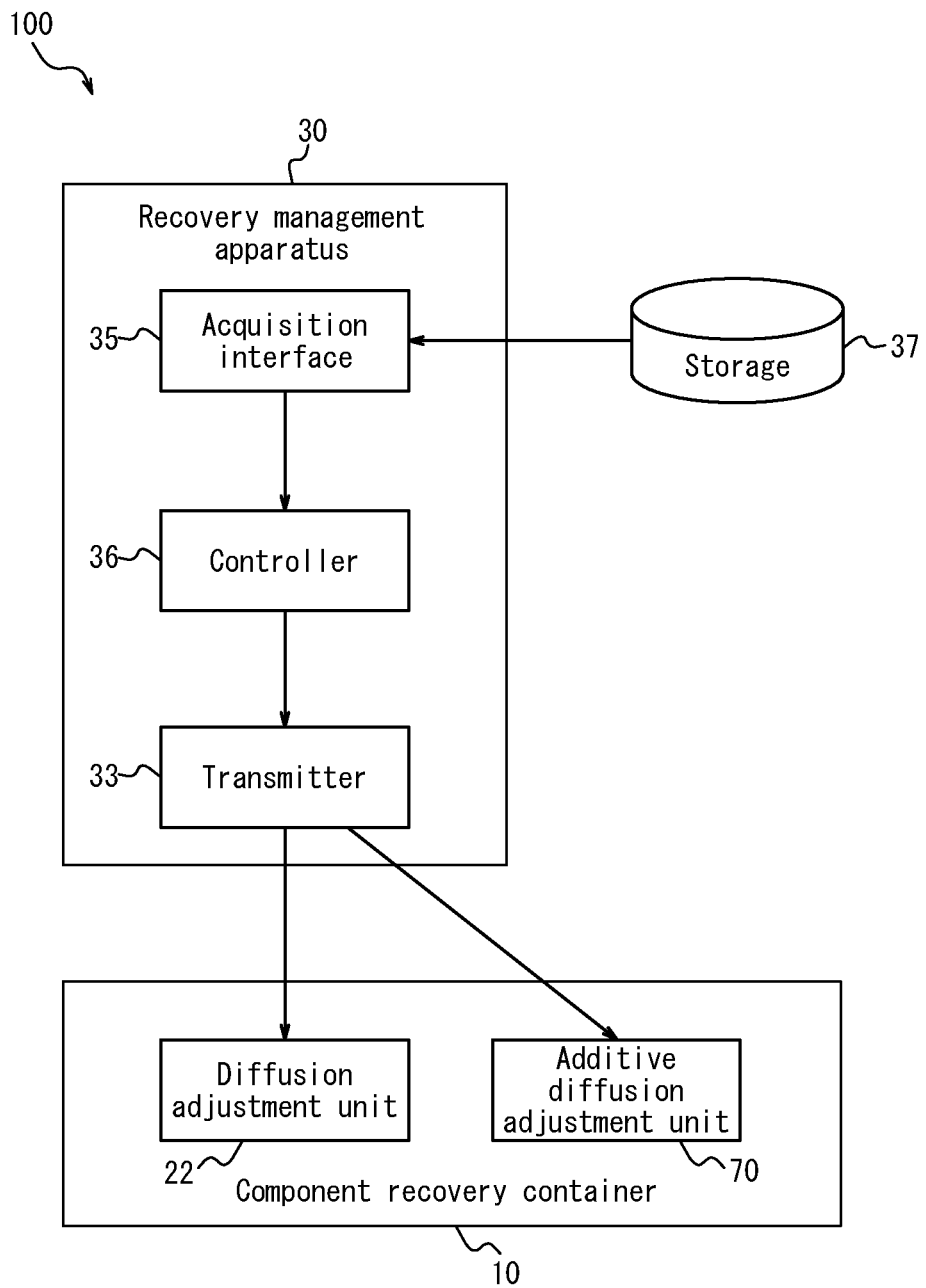
FIG. 24 is a functional block diagram illustrating an example of the basic structure of a component recovery system that includes an additive diffusion mechanism.

In an embodiment, the component recovery system may include a component recovery container that, in addition to the above-described component recovery mechanism 23, further includes an additive diffusion mechanism that adds an additive to the target 13. As illustrated in FIG. 24, the component recovery system 100 includes the component recovery container 10 and the recovery management apparatus 30. The component recovery container 10 includes the above-described component recovery mechanism 23, the additive diffusion mechanism, and the target introduction unit 11 for introducing the target 13, and the target introduction unit 11 and the component recovery mechanism 23 are connected via the diffusion adjustment unit 22. The target introduction unit 11 and the additive diffusion mechanism are connected via the diffusion adjustment unit 22. The component recovery mechanism 23 includes the recovery unit 20 for recovering the component for recovery and the diffusion adjustment unit 22 for adjusting the diffusion rate of the component for recovery from outside the recovery unit 20 to inside the recovery unit 20. The additive diffusion mechanism includes an additive retention unit for retaining an additive and an additive diffusion adjustment unit that adjusts the diffusion rate of the additive from outside the additive retention unit to inside the additive retention unit. The recovery management apparatus 30 includes the transmitter 33 that transmits the control signal 34.

[Configuration of Component Recovery System]

FIG. 24 illustrates an example of the basic structure of the component recovery system according to the present embodiment. As illustrated in FIG. 24, the component recovery container 10 includes an additive diffusion adjustment unit 70 in addition to the diffusion adjustment unit 22, and an additive control signal is transmitted from the transmitter 33 to the additive diffusion adjustment unit 70. While not illustrated, the storage 37 stores an addition protocol, that defines at least an addition procedure of the additive, in addition to the recovery protocol.

Figure 25:
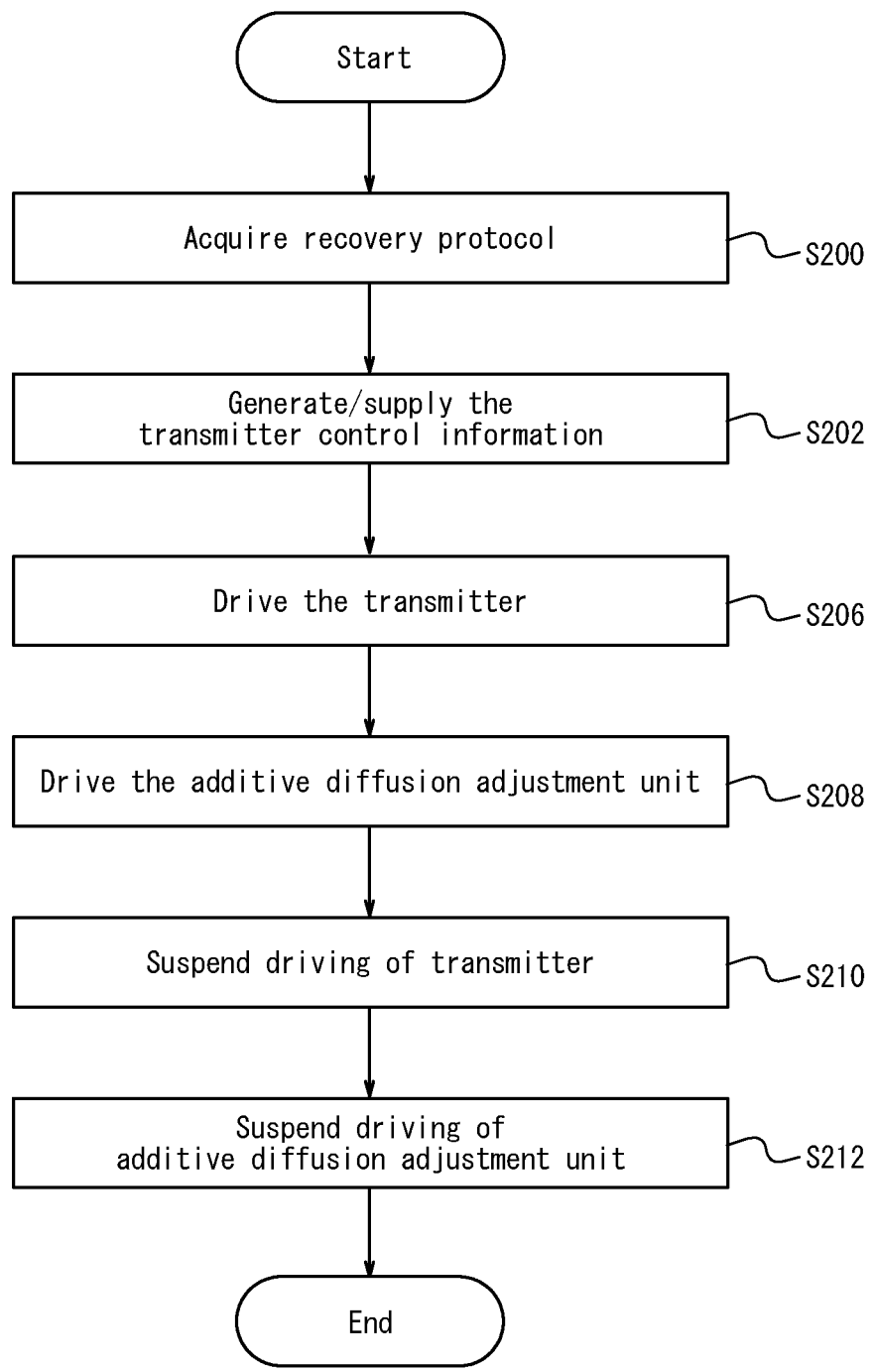
FIG. 25 is a flowchart illustrating an example of a method of adjusting the diffusion rate of an additive in a component recovery system that includes an additive diffusion mechanism.

The component recovery system 100 of the present embodiment adjusts the diffusion rate of the component for recovery from outside the recovery unit 20 to inside the recovery unit 20, and also adjusts the diffusion rate of the additive from inside the additive retention unit to outside the additive retention unit. An overview of operations of the component recovery system 100 is provided below with reference to the schematic configuration of FIG. 24 and the flowchart of FIG. 25. The acquisition interface 35 acquires the addition protocol stored in the storage 37 and supplies the addition protocol to the controller 36 (step S200). The controller 36 refers to the addition protocol to generate transmitter control information for controlling transmission of the additive control signal from the transmitter 33 and supplies the transmitter control information to the transmitter 33 (step S202). Based on the transmitter control information, the transmitter 33 transmits the additive control signal for adjusting the diffusion rate of the additive to the additive diffusion adjustment unit 70 of the component recovery container 10 (step S206). The additive diffusion adjustment unit 70 is driven (structurally changes) by receipt of the additive control signal and changes the diffusion rate of the additive from inside the additive retention unit to outside the additive retention unit via the additive diffusion adjustment unit 70 (step S208). Based on the transmitter control information, the transmitter 33 suspends transmission of the additive control signal (step S210). Upon suspension of the transmission of the additive control signal from the transmitter 33, the additive diffusion adjustment unit 70 stops being driven (changes to the state before receipt of the additive control signal), and the diffusion rate of the additive from inside the additive retention unit to outside the additive retention unit via the additive diffusion adjustment unit 70 returns to its original state (step S212). Adjustment of the diffusion rate of the additive from inside the additive retention unit to outside the additive retention unit in this way enables appropriate control of the amount and timing of additive that diffuses outside the additive retention unit.

Since each component of the component recovery system 100 according to the present embodiment has been described above, a description is omitted here.

The above-described component recovery mechanism 23, component recovery container 10, and component recovery system 100 can be used for a variety of applications. The component recovery mechanism 23, the component recovery container 10, and the component recovery system 100 can, for example, be used in culturing, biochemical reactions, or chemical reactions. Particularly suitable applications of the component recovery mechanism 23, the component recovery container 10, and the component recovery system 100 are described below.

<Culture Application>

The component recovery mechanism 23, the component recovery container 10, and the component recovery system 100 can be suitably used in culture applications. In culture applications, the component recovery mechanism 23, the component recovery container 10, and the component recovery system 100 can be used to recover a useful component for recovery secreted from the culture target during culturing, or can be used to recover a component for recovery that is no longer needed from the culture medium during culturing.

[Culture Component Recovery Mechanism]

A component recovery mechanism 23 for culturing, i.e., a culture component recovery mechanism, includes a recovery unit 20 configured to recover a component for recovery from a target 13 and a diffusion adjustment unit 22 configured to adjust a diffusion rate of the component for recovery from the target 13 into the recovery unit. The diffusion adjustment unit 22 changes the diffusion rate of the component for recovery from the target 13 to the recovery unit 20 according to a change in at least one environmental parameter, and the target 13 is a culture medium. By provision of such a culture component recovery mechanism in the culture container described below, for example, the component for recovery can be recovered from the culture medium while the culture target is cultured.

(Culture Medium)

The culture medium 13 that is targeted is not particularly limited and can be selected according to the type of cells or the purpose of culturing. For example, a well-known culture medium, such as a MEM culture medium, DMEM culture medium, RPMI-1640 culture medium, or the like may be used. Culture mediums being developed and used by specific groups as reported in known articles may also be used. An additive that does not require detailed control of addition may be mixed into the culture medium in advance and used. The culture medium may be a liquid or a gel.

(Component for Recovery)

The component for recovery can be a secretion secreted from the culture target during culturing. Such a secretion can be a protein, a low molecular weight compound, a sugar, a sugar chain, a nucleic acid, a lipid, a metabolite, an exosome, or the like. Examples of nucleic acids include DNA and RNA, and examples of RNA include mRNA and miRNA. Some of these secretions have low stability in the culture medium and decompose over time, but by use of a culture component recovery mechanism to recover the secretions at the timing of secretion, the secretions can be recovered before they decompose. In addition, the secretion amount of some secretions is determined by feedback adjustment in the culture target, but the recovered amount of such secretions can be increased by culturing while recovering the secretions.

The component for recovery can also be an additive that is only needed at a particular timing during culturing and is preferably removed thereafter from the culture medium. Such additives can be differentiation-inducing factors, cell growth factors, antibodies, hormones, chemokines, or the like, which are known to function as biological signals. Taking differentiation-inducing factors as an example, the amount and timing of secretion of differentiation-inducing factors are precisely controlled in vivo to achieve differentiation into complex tissues. Therefore, to artificially induce the differentiation of a culture target, differentiation-inducing factors that are no longer necessary are preferably recovered at a predetermined timing after the differentiation-inducing factors are added. By recovery of additives that are no longer needed, it is possible to prevent differentiation from being hindered by the presence of unnecessary additives in the culture medium.

The above-described component for recovery need only be contained in the culture medium at least at the time of component recovery and need not be contained in the culture medium before the start of culturing. For example, a precursor of the component for recovery is included in the culture medium before the start of culturing.

(Culture Target)

Any culture target can be cultured using the culture component recovery mechanism 23. Cells can suitably be cultured as the culture target. Either adhesive cells or floating cells can be cultured. The cells may be any of unicellular organisms, animal cells, plant cells, insect cells, or tumor cells. The cells may also be stem cells or cells derived from organs. Examples of stem cells include iPS cells, ES cells, mesenchymal stem cells, hematopoietic stem cells, neural stem cells, and Muse cells.

The component recovery mechanism 23 can be used not only to culture single cells, but also to culture tissue formed by a plurality of cells gathering together and to culture multi-cellular microbes.

[Culture Container]

A component recovery container 10 for culturing, i.e., a culture container, includes the above-described culture component recovery mechanism and a target introduction unit 11 configured to introduce the target 13. The target introduction unit 11 and the culture component recovery mechanism are connected via the diffusion adjustment unit 22. The target 13 is a culture medium, and the target introduction unit 11 is a culture unit for culturing a culture target in the culture medium. According to such a culture container, a component for recovery can be recovered from the culture medium while culturing the culture target in the culture medium introduced into the culture unit.

The culture medium and the culture target are introduced into the culture unit. The culture unit can be configured in the same way as a typical culture container in accordance with the purpose of culturing.

When a secretion secreted during culturing is the component for recovery, then in order to suitably cause diffusion of the component for recovery to the recovery unit 20, the difference in concentration of the component for recovery between the culture medium before the start of culturing and the recovery unit 20 is preferably small. The difference in concentration of the component for recovery between the target 13 and the recovery unit 20 at the point before the start of culturing is preferably 100 pmol/mL or less.

[Culture System]

A component recovery system 100 for culturing, i.e., a culture system, includes the above-described component recovery container 10 and a recovery management apparatus 30. The recovery management apparatus 30 includes an acquisition interface 35, a controller 36, and a transmitter 33. The acquisition interface 35 is configured to acquire a recovery protocol that defines at least a recovery procedure of the component for recovery. The controller 36 is configured to refer to the recovery protocol to generate transmitter control information. The transmitter 33 is configured to transmit a control signal 34, to the diffusion adjustment unit 22, for adjusting the diffusion rate of the component for recovery from the culture medium to the recovery unit based on the transmitter control information. The diffusion adjustment unit 22 may be configured to adjust the diffusion rate of the component for recovery from the culture medium to the recovery unit 20 based on the control signal 34. According to such a culture system, a component for recovery can be recovered from the culture medium while culturing the culture target in the culture medium introduced into the culture unit.

In an example, the culture target is cells, and the above-described culture target state measurement unit measures the degree of differentiation of the cells. The controller 36 refers to the measurement result of the degree of differentiation of the cells to generate transmitter control information such that the type and amount of the component for recovery corresponding to the degree of differentiation is recovered. The transmitter 33 refers to the transmitter control information and transmits a control signal 34 of a predetermined length to the diffusion adjustment unit 22 of the component recovery mechanism 23 in which a predetermined type of component for recovery is retained. The diffusion adjustment unit 22 that receives the control signal 34 is driven for a predetermined time corresponding to the length of the control signal 34 and recovers the component for recovery. Adding the component for recovery appropriately in accordance with the degree of differentiation of cells in this way enables more suitable control of the differentiation of cells. This component recovery system 100 can, for example, also easily switch the type of component for recovery that is recovered according to the degree of differentiation.

The culture system may further include an additive diffusion mechanism that includes an additive retention unit configured to retain an additive used in a culture, and an additive diffusion adjustment unit 70 configured to adjust a diffusion rate of the additive from inside the additive retention unit to outside the additive retention unit. The acquisition interface 35 may be further configured to acquire an addition protocol that defines an addition procedure of the additive. The controller 36 may be further configured to refer to the addition protocol to generate transmitter control information. The transmitter 33 may be configured to transmit an additive control signal for adjusting the diffusion rate of the additive to the additive diffusion adjustment unit 70 based on the transmitter control information, and the additive diffusion adjustment unit 70 may be configured to adjust the diffusion rate of the additive based on the additive control signal. According to such a component recovery system that uses the component recovery mechanism 23 and the additive diffusion mechanism together, the addition of the additive to the target 13 and the recovery of the component for recovery from the target 13 can both be controlled efficiently and easily. According to such a culture system, for example, an additive can be added to the culture medium at a predetermined timing, and the additive can be recovered from the culture medium at a predetermined timing. Culturing can thus be performed while adjusting the additive and the component for recovery in the medium as desired.

[Method of Producing Cells]

An example of a method of producing cells according to the present disclosure is described next. The method of producing cells uses the above-described culture system. In greater detail, a method of producing cells may be a method of producing cells using a culture system that includes a culture container according to the present disclosure and a recovery management apparatus 30 that includes an acquisition interface 35, a controller 36, and a transmitter 33, the method including acquiring, by the acquisition interface 35, a recovery protocol that defines at least a recovery procedure of the component for recovery, generating, by the controller 36, transmitter control information with reference to the recovery protocol, transmitting, by the transmitter 33, a control signal 34 to the diffusion adjustment unit 22 for adjusting the diffusion rate of the component for recovery based on the transmitter control information, and adjusting, by the diffusion adjustment unit 22, the diffusion rate of the component for recovery based on the control signal 34. Such a method of producing cells enables cell production while efficiently and conveniently adjusting the recovery of the component for recovery from the culture medium.

The culture system according to the present disclosure can be used not only to produce cells but also to produce tissue that includes a plurality of cells.

<Biochemical Reaction Applications, Chemical Reaction Applications>

The component recovery mechanism 23, the component recovery container 10, and the component recovery system 100 can also be suitably used in biochemical reaction applications and in chemical reaction applications. In biochemical reaction applications and chemical reaction applications, the component recovery mechanism 23, the component recovery container 10, and the component recovery system 100 can be used to recover a reaction product, as a component for recovery, from a reaction solution while a biochemical reaction and/or a chemical reaction are caused.

(Target)

The target 13 can be a reaction solution of a biochemical reaction or a chemical reaction. Prior to the start of the reaction, the target 13 includes at least a reactant of the biochemical reaction or the chemical reaction. In a biochemical reaction, the target 13 can, for example, be a reaction solution of a biochemical reaction such as a polymerase chain reaction (PCR) or cell-free protein synthesis. The target 13 is not limited to the reaction solution of a synthesis reaction but can also be the reaction solution of a decomposition reaction including decomposition enzymes such as amylase, cellulase, protease, and lipase.

(Component for Recovery)

The component for recovery can be a reaction product or by-product of a biochemical reaction or a chemical reaction. For example, if the target 13 is a reaction solution of a polymerase chain reaction (PCR), the component for recovery can be a PCR product having a predetermined sequence. If the target 13 is a cell-free protein synthesis system, the component for recovery can be a predetermined protein synthesized by the cell-free protein synthesis system. The component for recovery can also be a decomposition product of a decomposition enzyme such as amylase, cellulase, protease, and lipase. In one example, the component for recovery can be a decomposition product obtained when cellulose is decomposed by cellulase. As an example of use, the progress of a reaction can be monitored by recovering, at a predetermined timing, these components for recovery produced by the reaction. Also, by recovery of the by-products of a reaction at a predetermined timing, the reaction can be prevented from being inhibited by the by-products.

INDUSTRIAL APPLICABILITY

The component recovery mechanism, component recovery container, component recovery system, culture container, culture system, and method of producing cells according to the present disclosure can be used in the fields of biochemistry, regenerative medicine, drug discovery, and cellular agriculture.

The invention claimed is:

1. A component recovery mechanism comprising:
 a porous material configured to recover a component for recovery from a target; and
 a physical barrier or stimulus-responsive material configured to adjust a diffusion rate of the component for recovery from the target to the porous material, wherein
 the physical barrier or stimulus-responsive material changes the diffusion rate of the component for recovery from the target to the porous material according to a change in at least one environmental parameter, wherein the porous material comprises an affinity substance or functional group with affinity for the component for recovery, and the affinity substance or functional group is bound to the porous material via a carrier, and an outer diameter of the carrier is greater than a maximum pore diameter of the porous material in a swollen state.

2. The component recovery mechanism of claim 1, wherein the porous material comprises a re-diffusion suppression mechanism configured to suppress re-diffusion of the component for recovery from the porous material to the target.

3. The component recovery mechanism of claim 1, wherein a water absorption rate of the porous material is between 10% and 500% inclusive.

4. The component recovery mechanism of claim 1, wherein the physical barrier or stimulus-responsive material comprises a stimulus responsive material and changes the diffusion rate of the component for recovery from the target to the porous material according to at least one stimulus.

5. The component recovery mechanism of claim 4, wherein
the physical barrier or stimulus-responsive material further comprises a near-infrared absorber that absorbs near-infrared rays, and the stimulus-responsive material is a temperature-responsive material, and
the temperature-responsive material changes the diffusion rate of the component for recovery from the target to the porous material according to a temperature change of the near-infrared absorber.

6. A component recovery container comprising the component recovery mechanism of claim 1 and a target introduction vessel configured to introduce the target, wherein the target introduction vessel and the component recovery mechanism are connected via the physical barrier or stimulus-responsive material.

7. A component recovery kit comprising the component recovery mechanism of claim 1.

8. A culture container comprising:
the component recovery mechanism of claim 1, and a target introduction vessel configured to introduce the target, wherein
the target introduction vessel and the component recovery mechanism are connected via the physical barrier or stimulus-responsive material, and
the target is a culture medium, and the target introduction vessel is a culture vessel for culturing a culture target in the culture medium.

9. A component recovery system comprising:

a component recovery container and a recovery management apparatus, wherein the component recovery container comprises a component recovery mechanism and a target introduction vessel configured to introduce the target, the component recovery mechanism comprises:

a porous material configured to recover a component for recovery from a target; and a physical barrier or stimulus-responsive material configured to adjust a diffusion rate of the component for recovery from the target to the porous material, the physical barrier or stimulus-responsive material changes the diffusion rate of the component for recovery from the target to the porous material according to a change in at least one environmental parameter, the target introduction vessel and the component recovery mechanism are connected via the physical barrier or stimulus-responsive material, the recovery management apparatus comprises an acquisition interface, a controller, and a transmitter, the acquisition interface is configured to acquire a recovery protocol that defines at least a recovery procedure of the component for recovery, the controller is configured to refer to the recovery protocol to generate transmitter control information, the transmitter is configured to transmit a control signal, to the physical barrier or stimulus-responsive material, for adjusting the diffusion rate of the component for recovery into the porous material based on the transmitter control information, and the physical barrier or stimulus-responsive material is configured to adjust the diffusion rate of the component for recovery from the target to the porous material based on the control signal.

10. The component recovery system of claim 9, further comprising an additive diffusion mechanism comprising:

an additive retention vessel configured to retain an additive to be added to the target, and an additive physical barrier or stimulus-responsive material configured to adjust a diffusion rate of the additive from inside the additive retention vessel to outside the additive retention vessel, wherein the acquisition interface is further configured to acquire an addition protocol that defines an addition procedure of the additive, the controller is further configured to refer to the addition protocol to generate transmitter control information, the transmitter is configured to transmit an additive control signal, to the additive physical barrier or stimulus-responsive material, for adjusting the diffusion rate of the additive based on the transmitter control information, and the additive physical barrier or stimulus-responsive material is configured to adjust the diffusion rate of the additive based on the additive control signal.

11. A culture system comprising:

a culture container and a recovery management apparatus, wherein the culture container comprises:

a component recovery mechanism, and a target introduction vessel configured to introduce the target, the component recovery mechanism comprises:

a porous material configured to recover a component for recovery from a target; and a physical barrier or stimulus-responsive material configured to adjust a diffusion rate of the component for recovery from the target to the porous material, the physical barrier or stimulus-responsive material changes the diffusion rate of the component for recovery from the target to the porous material according to a change in at least one environmental parameter, the target introduction vessel and the component recovery mechanism are connected via the physical barrier or stimulus-responsive material, the target is a culture medium, and the target introduction vessel is a culture vessel for culturing a culture target in the culture medium, the recovery management apparatus comprises an acquisition interface, a controller, and a transmitter, the acquisition interface is configured to acquire a recovery protocol that defines at least a recovery procedure of the component for recovery, the controller is configured to refer to the recovery protocol to generate transmitter control information, the transmitter is configured to transmit, to the physical barrier or stimulus-responsive material, a control signal for adjusting the diffusion rate of the component for recovery from the culture medium into the porous material based on the transmitter control information, and the physical barrier or stimulus-responsive material is configured to adjust the diffusion rate of the component for recovery from the culture medium to the porous material based on the control signal.

12. The culture system of claim 11, further comprising an additive diffusion mechanism comprising:

an additive retention vessel configured to retain an additive used in a culture, and an additive physical barrier or stimulus-responsive material configured to adjust a diffusion rate of the additive from inside the additive retention vessel to outside the additive retention vessel, wherein the acquisition interface is further configured to acquire an addition protocol that defines an addition procedure of the additive, the controller is further configured to refer to the addition protocol to generate transmitter control information, the transmitter is configured to transmit an additive control signal, to the additive physical barrier or stimulus-responsive material, for adjusting the diffusion rate of the additive based on the transmitter control information, and the additive physical barrier or stimulus-responsive material is configured to adjust the diffusion rate of the additive based on the additive control signal.

13. A method of producing cells, the method comprising:

acquiring, by the acquisition interface of the culture system of claim 11, the recovery protocol that defines at least the recovery procedure of the component for recovery, generating, by the controller of the culture system of claim 11, transmitter control information with reference to the recovery protocol, transmitting, by the transmitter of the culture system of claim 11, the control signal to the physical barrier or stimulus-responsive material of the culture system of claim 11 for adjusting the diffusion rate of the component for recovery based on the transmitter control information, and adjusting, by the physical barrier or stimulus-responsive material, the diffusion rate of the component for recovery based on the control signal.

* * * * *